US012291612B2

(12) United States Patent
Ouchiyama et al.

(10) Patent No.: US 12,291,612 B2
(45) Date of Patent: May 6, 2025

(54) FIBER-REINFORCED RESIN BASE MATERIAL

(71) Applicant: Toray Industries, Inc., Tokyo (JP)

(72) Inventors: Naoya Ouchiyama, Nagoya (JP); Masayuki Koshi, Nagoya (JP); Yoshihiro Naruse, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 871 days.

(21) Appl. No.: 17/441,930

(22) PCT Filed: Mar. 17, 2020

(86) PCT No.: PCT/JP2020/011802
§ 371 (c)(1),
(2) Date: Sep. 22, 2021

(87) PCT Pub. No.: WO2020/196109
PCT Pub. Date: Oct. 1, 2020

(65) Prior Publication Data
US 2022/0162408 A1 May 26, 2022

(30) Foreign Application Priority Data
Mar. 26, 2019 (JP) ................................. 2019-058157

(51) Int. Cl.
*C08J 5/04* (2006.01)
*C08J 5/24* (2006.01)
*C08L 81/02* (2006.01)

(52) U.S. Cl.
CPC .............. *C08J 5/042* (2013.01); *C08J 5/243* (2021.05); *C08L 81/02* (2013.01); *C08J 2381/02* (2013.01); *C08J 2471/12* (2013.01); *C08J 2479/08* (2013.01); *C08J 2481/06* (2013.01)

(58) Field of Classification Search
CPC ...... C08L 81/02; C08L 2205/02; C08L 83/06; C08L 71/12; C08L 81/06; C08J 2381/02; C08J 2481/02; C08J 2383/06; C08J 2483/06; C08J 2371/12; C08J 2471/12; C08J 2381/06; C08J 2481/06; C08J 5/042
See application file for complete search history.

(56) References Cited

U.S. PATENT DOCUMENTS

| 5,639,544 | A | 6/1997 | Miyaji et al. | |
|---|---|---|---|---|
| 6,071,602 | A * | 6/2000 | Caldwell | D06N 3/128 428/221 |
| 10,370,522 | B2 | 8/2019 | Peng et al. | |
| 11,155,686 | B2 | 10/2021 | Koshi et al. | |
| 2008/0258337 | A1* | 10/2008 | Ajbani | C08G 65/336 264/241 |
| 2012/0028047 | A1 | 2/2012 | Imai et al. | |
| 2014/0228519 | A1 | 8/2014 | Nakayama et al. | |
| 2015/0063885 | A1* | 3/2015 | Mitani | G03G 15/2057 399/333 |
| 2021/0292491 | A1* | 9/2021 | Ouchiyama | C08J 5/243 |

FOREIGN PATENT DOCUMENTS

| CN | 102936412 A | 2/2013 | |
|---|---|---|---|
| CN | 103087524 A | 5/2013 | |
| CN | 105377991 A | 3/2016 | |
| CN | 108410128 A * | 8/2018 | ............. B32B 15/08 |
| CN | 108779271 A | 11/2018 | |
| EP | 0 524 343 A1 | 1/1993 | |
| EP | 3 825 348 | 5/2021 | |
| JP | S61-126172 A | 6/1986 | |
| JP | S63-125531 A | 5/1988 | |
| JP | H07-41577 A | 2/1995 | |
| JP | H08-183867 A | 7/1996 | |
| JP | 2003-231813 A | 8/2003 | |
| JP | 2009074043 A * | 4/2009 | ............... B29B 9/14 |
| WO | 2010/107022 A1 | 9/2010 | |
| WO | 2013/051404 A1 | 4/2013 | |
| WO | WO-2020017287 A1 * | 1/2020 | ............. C08G 75/02 |
| WO | WO-2020017288 A1 * | 1/2020 | |

OTHER PUBLICATIONS

Krooss et al., "Investigation of Morphologies and Tensile Impact Toughness of Immiscible Polyphenylene Sulfide/Polyether Sulfone Films and Carbon Fiber Composites by Quantitative Optical Methods," Polym. Composites 40(9), 3725-3736 (Year: 2019).*
Partial machine translation of WO-2020017288-A1 (Year: 2020).*
Partial machine translation of CN-108410128-A (Year: 2018).*
Partial machine translation of JP-2009074043-A (Year: 2009).*
Extended European Search Report dated Nov. 7, 2022, of counterpart European Patent Application No. 20779037.9.
First Office Action dated Oct. 10, 2022, of counterpart Chinese Patent Application No. 202080024154.8, along with an English translation.

* cited by examiner

*Primary Examiner* — Kregg T Brooks
(74) *Attorney, Agent, or Firm* — DLA Piper LLP (US)

(57) ABSTRACT

A fiber-reinforced resin base material includes continuous reinforcing fibers or a reinforcing fiber base material in which discontinuous fibers are dispersed, the continuous reinforcing fibers or a reinforcing fiber base material being impregnated with a polyphenylene sulfide resin composition, wherein the fiber-reinforced resin base material has a glass-transition temperature, as measured by the DMA method (bending mode), of 115° C. or higher.

3 Claims, 2 Drawing Sheets

FIBER-REINFORCED RESIN BASE MATERIAL

TECHNICAL FIELD

This disclosure relates to a fiber-reinforced resin base material.

BACKGROUND

A fiber-reinforced resin base material including continuous reinforcing fibers or a reinforcing fiber base material in which discontinuous reinforcing fibers are dispersed, the continuous reinforcing fibers or the reinforcing fiber base material being impregnated with a thermoplastic resin, not only has an excellent weight reduction effect, but also has a better toughness, welding workability and recycling properties than those of a fiber-reinforced resin base material in which a thermosetting resin is used, and is therefore widely used in a variety of applications, for example, transportation equipment such as aircrafts and automobiles, sports goods, and electric and electronic components. In recent years, high added values such as high heat resistance, low water adsorption, high toughness and molding processability are demanded, in addition to mechanical strength and weight reduction effect, which have conventionally been the added values of a CFRTP (carbon fiber-reinforced thermoplastic resin) intermediate base material, and the technical development of a high-function CFRTP intermediate base material is strongly demanded, mainly in the applications of aircrafts and automobiles.

For example, carbon fiber-reinforced thermoplastic resin prepregs disclosed in JP 63-125531 A are known, as structural composite materials having an excellent mechanical strength, heat resistance and molding processability.

JP '531 discloses a carbon fiber-reinforced resin composition including carbon fibers, in which the carbon fibers are impregnated with a mixture of a copolymer of polyphenylene sulfide (sometimes PPS) and polyphenylene sulfide sulfone (sometimes PPSS), and at least one of PPS and PPSS.

However, since polyphenylene sulfide sulfone is a polymer having a poor residence stability and a low toughness although having an excellent heat resistance, the technique disclosed in JP '531 had a problem that defective impregnation of the resin into the carbon fibers occurs, resulting in a significant decrease in the mechanical strength. Further, JP '531 is silent about whether a glass-transition temperature as measured by the DMA method of 115° C. or higher is achieved and the heat resistance and the mechanical strength are significantly improved.

Therefore, it would be helpful to provide a fiber-reinforced resin base material having excellent impregnation properties and thermal stability, a good surface quality with fewer voids, and a high heat resistance.

SUMMARY

We thus provide:

A fiber-reinforced resin base material, including continuous reinforcing fibers or a reinforcing fiber base material in which discontinuous reinforcing fibers are dispersed, the continuous reinforcing fibers or the reinforcing fiber base material being impregnated with a polyphenylene sulfide resin composition, wherein the fiber-reinforced resin base material has a glass-transition temperature, as measured by the DMA method (bending mode), of 115° C. or higher.

The fiber-reinforced resin base material has a bending strain (measured at 110° C., using a tensile testing machine, Instron 5565, equipped with a thermostatic chamber) of a molded specimen in accordance with ASTM D790 of preferably 1.1% or more.

The polyphenylene sulfide resin composition preferably has a melt viscosity (measured at an orifice length of 5 mm, an orifice diameter of 0.5 mm, a temperature of 320° C., and a shear rate of 9,728 sec$^{-1}$) of 120 Pa·s or less.

The polyphenylene sulfide resin composition is preferably a polyphenylene sulfide resin composition composed of a polyphenylene sulfide resin (A) and a thermoplastic resin (B) having a glass-transition temperature of 100° C. or higher.

The polyphenylene sulfide resin composition preferably includes from 99 to 60% by weight of the polyphenylene sulfide resin (A), and from 1 to 40% by weight of the thermoplastic resin (B) having a glass-transition temperature of 100° C. or higher, with respect to 100% by weight of the total amount of the polyphenylene sulfide resin (A) and the thermoplastic resin (B) having a glass-transition temperature of 100° C. or higher;

wherein the thermoplastic resin (B) having a glass-transition temperature of 100° C. or higher forms island phases; and wherein the thermoplastic resin (B) having a glass-transition temperature of 100° C. or higher has a number average particle size of 10 μm or less.

The thermoplastic resin (B) having a glass-transition temperature of 100° C. or higher, which forms the island phases, preferably has a number average particle size smaller than the distance z between reinforcing fibers represented by equation (1):

$$z = y - 2r \tag{1}$$

z: distance between reinforcing fibers, y: distance between centers of reinforcing fibers, r: fiber radius.

The thermoplastic resin (B) having a glass-transition temperature of 100° C. or higher is preferably at least one amorphous resin selected from the group consisting of a polyetherimide resin, a polyethersulfone resin, a polyphenyl sulfone, a polysulfone resin and a polyphenyleneether resin.

It is preferred that the polyphenylene sulfide resin composition further includes a compound (C) having one or more groups selected from the group consisting of epoxy, amino and isocyanate groups, in an amount of 0.1 to 10 parts by weight with respect to 100 parts by weight of the total amount of the polyphenylene sulfide resin (A) and the thermoplastic resin (B) having a glass-transition temperature of 100° C. or higher.

It is thus possible to obtain a fiber-reinforced resin base material having excellent impregnation properties and thermal stability, an improved surface quality with fewer voids, and a high heat resistance.

DETAILED DESCRIPTION

Figure 1:
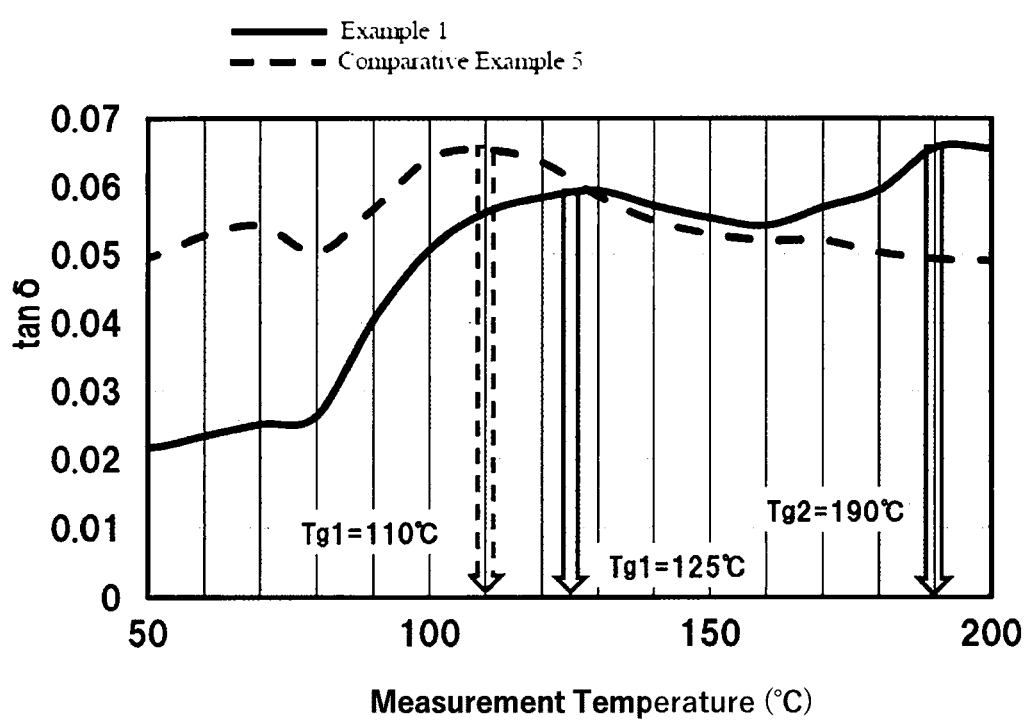
FIG. 1 is a measurement chart of the dynamic viscoelasticity of the fiber-reinforced resin base materials of Example 1 and Comparative Example 5.

Examples will now be described in detail. The fiber-reinforced resin base material according to an example is obtained as either of the following two examples. A first example is a fiber-reinforced resin base material including continuous reinforcing fibers, the continuous reinforcing fibers being impregnated with a polyphenylene sulfide resin composition to be described later. A second example is a fiber-reinforced resin base material including a reinforcing fiber base material in which discontinuous reinforcing fibers are dispersed, the reinforcing fiber base material being impregnated with the polyphenylene sulfide resin composition to be described later.

The "continuous reinforcing fibers" in the first example refer to reinforcing fibers which are continuing without being cut, in the fiber-reinforced resin base material. The form and orientation of the reinforcing fibers in the first example may be, for example, reinforcing fibers oriented in one direction, a woven fabric (cloth), a knitted fabric, a braid, a tow, or the like. In particular, the reinforcing fibers are preferably oriented in one direction, because the mechanical properties in a certain direction can be enhanced efficiently.

The "reinforcing fiber base material in which discontinuous reinforcing fibers are dispersed" in the second example refers to a base material in the form of a mat in which the reinforcing fibers that are cut are dispersed, in the fiber-reinforced resin base material. The reinforcing fiber base material in the second example can be obtained by an arbitrary method such as, for example, the wet method in which the reinforcing fibers are dispersed in a solution, and then formed in the form of a sheet, or the dry method using a carding device or an air-laying device. From the viewpoint of productivity, the dry method using a carding device or an air-laying device is preferred.

In the second example, the discontinuous reinforcing fibers to be dispersed in the reinforcing fiber base material preferably have a number average fiber length of 3 to 100 mm When the discontinuous reinforcing fibers have a number average fiber length of 3 mm or more, the reinforcing effect of the discontinuous reinforcing fibers can be sufficiently obtained, and the mechanical strength of the resulting fiber-reinforced resin base material can further be improved. The number average fiber length of the discontinuous reinforcing fibers is preferably 5 mm or more. On the other hand, when the discontinuous reinforcing fibers have a number average fiber length of 100 mm or less, the flowability during molding can further be improved. The number average fiber length of the discontinuous reinforcing fibers is more preferably 50 mm or less, and still more preferably 30 mm or less.

In the second example, the number average fiber length of the discontinuous reinforcing fibers can be determined by the following method. First, a sample having a size of 100 mm×100 mm is cut out from the fiber-reinforced resin base material, and the thus cut-out sample is heated in an electric furnace controlled to 600° C. for 1.5 hours, to burn off the matrix resin. Thereafter, 400 pieces of discontinuous reinforcing fiber bundles are collected at random, from the thus obtained fiber-reinforced resin base material. The fiber length of each of the collected discontinuous reinforcing fiber bundles was measured in 1 mm increment, using a vernier caliper, and the number average fiber length (Ln) can be calculated by equation (2):

$$Ln = \Sigma Li/400 \quad (2)$$

Li: measured fiber length (i=from 1,2,3 . . . up to 400) (unit: mm).

The number average fiber length of the discontinuous reinforcing fibers can be adjusted within the range described above: by cutting the reinforcing fibers to a desired length during the production of the reinforcing fiber base material. The orientation of the discontinuous reinforcing fibers in the mat is not particularly limited, but it is preferred that the reinforcing fibers be isotropically dispersed, from the viewpoint of formability.

The type of the reinforcing fibers in the first or the second example is not particularly limited, and examples thereof include carbon fibers, metal fibers, organic fibers and inorganic fibers. Two or more types of these fibers may be used.

Examples of the carbon fibers include: PAN-based carbon fibers made from polyacrylonitrile (PAN) fibers; pitch-based carbon fibers made from petroleum tar or petroleum pitch; cellulose-based carbon fibers made from viscose rayon, cellulose acetate and the like; vapor-grown carbon fibers made from hydrocarbons and the like; and graphitized fibers of these fibers. Among these carbon fibers, PAN-based carbon fibers are preferably used, because of their excellent balance between strength and elastic modulus.

Examples of the metal fibers include fibers composed of metals such as iron, gold, silver, copper, aluminum, brass and stainless steel.

Examples of the organic fibers include fibers composed of organic materials such as aramids, polybenzoxazole (PBO), polyphenylene sulfide, polyesters, polyamides and polyethylene. Examples of the aramid fibers include: para-aramid fibers having an excellent strength and elastic modulus; and meta-aramid fibers having an excellent flame resistance and long-term heat resistance. Examples of the para-aramid fibers include: polyparaphenylene terephthalamide fibers, and co-polyparaphenylene-3,4'-oxydiphenylene terephthalamide fibers, and examples of the meta-aramid fibers include polymetaphenylene isophthalamide fibers. As the aramid fibers, para-aramid fibers having an elastic modulus higher than that of meta-aramid fibers are preferably used.

Examples of the inorganic fibers include fibers composed of inorganic materials such as glass, basalt, silicon carbide and silicon nitride. Examples of the glass fibers include E-glass fibers (for electric applications), C-glass fibers (for anti-corrosion applications), S-glass fibers, and T-glass fibers (with a high strength and high elastic modulus). The basalt fibers are fibers obtained by forming basalt, which is a mineral, into fibers, and having a very high heat resistance. Basalt generally contains 9 to 25% by weight of FeO or $FeO_2$, which is an iron compound, and 1 to 6% by weight of TiO or $TiO_2$, which is a titanium compound. It is also possible to increase the amount of these components in a molten state, and then form into fibers.

The fiber-reinforced resin base material in the first or the second example is expected to serve as a reinforcing material in many applications and, thus, it is desirable to exhibit high mechanical properties. To exhibit high mechanical properties, the reinforcing fibers preferably include carbon fibers.

The reinforcing fibers usually have a configuration in which one or a plurality of reinforcing fiber bundles, each formed by bundling a number of monofilaments, are arranged. The total number of filaments (number of monofilaments) in the reinforcing fibers, when one or a plurality of reinforcing fiber bundles are arranged, is preferably 1,000 to 2,000,000.

From the viewpoint of productivity, the total number of filaments in the reinforcing fibers is more preferably 1,000 to 1,000,000, still more preferably 1,000 to 600,000, and particularly preferably 1,000 to 300,000. The upper limit of the total number of filaments in the reinforcing fibers may be any value, as long as the productivity, dispersibility and handleability can be well maintained, taking into consideration the balance with the dispersibility and the handleability, as well.

One reinforcing fiber bundle is preferably formed by bundling 1,000 to 50,000 reinforcing fiber monofilaments having a mean diameter of 5 to 10 μm.

The fiber-reinforced resin base material in the first example is characterized in that the thermoplastic resin to be impregnated into the continuous reinforcing fibers is the polyphenylene sulfide resin composition to be described later. Further, the fiber-reinforced resin base material in the second example is characterized in that the thermoplastic resin to be impregnated into the reinforcing fiber base material in which the discontinuous reinforcing fibers are dispersed is the polyphenylene sulfide resin composition to be described later.

The fiber-reinforced resin base material has a glass-transition temperature, as measured by the DMA method (bending mode), of 115° C. or higher, preferably 120° C. or higher, and more preferably 125° C. or higher. The upper limit of the glass-transition temperature, as measured by the DMA method (bending mode), of the fiber-reinforced resin base material is preferably 240° C., more preferably 230° C. or lower, and still more preferably 200° C. or lower. When the glass-transition temperature, as measured by the DMA method (bending mode), of the fiber-reinforced resin base material is less than 115° C., the mechanical properties at high temperature of the fiber-reinforced base material tends to decrease, and it leads to a failure to obtain a fiber-reinforced base material having a better heat resistance. When the upper limit of the glass-transition temperature, as measured by the DMA method (bending mode), of the fiber-reinforced resin base material is within the preferred range described above, the polyphenylene sulfide resin composition has an appropriate melt viscosity, and thus achieves excellent impregnation into the reinforcing fibers, making it possible to obtain a fiber-reinforced base material well impregnated with the polyphenylene sulfide resin composition.

To measure the glass-transition temperature of the fiber-reinforced resin base material impregnated with the polyphenylene sulfide resin composition, a dynamic viscoelasticity measurement, specifically, the DMA method (bending mode) can be used. In the DMA method (bending mode), the fiber-reinforced resin base material is cut in the form of a rectangular column having a length of 20 mm, a width of 12 mm and a thickness of 2 mm to be used as a sample, and the measurement of the sample can be carried out at a measurement temperature of from 30° C. to 250° C., a temperature rise rate of 2° C./min, a measurement frequency of 1 Hz (sine wave mode) and a strain amplitude of 10 μm, in the flexural test mode, using DMS 6100, manufactured by Seiko Instruments Inc. The glass-transition temperature in the DMA method (bending mode) indicates the peak temperature of the loss tangent (tan δ) (namely, storage modulus G'/loss modulus G").

As examples of the glass-transition temperatures of the fiber-reinforced resin base materials, FIG. 1 shows both: the measurement chart of the dynamic viscoelasticity of the fiber-reinforced resin base material of Example 1 to be described later, in which a resin composition containing 90% by weight of a PPS resin (A-1), 10% by weight of a polyetherimide resin (B), and 1.0 parts by weight of an isocyanate silane compound (C-1) is used, and in which the volume fraction of carbon fibers is 60%; and the measurement chart of the dynamic viscoelasticity of the fiber-reinforced resin base material of Comparative Example 3, in which 100% by weight of the PPS resin (A-1) is used, and in which the volume fraction of carbon fibers is 60%.

It can be seen from FIG. 1 that the glass-transition temperature Tg1 derived from the PPS resin is 125° C. in Example 1, and 110° C. in Comparative Example 5, and that the glass-transition temperature Tg2 derived from the polyetherimide resin is 190° C. in Example 1.

The melt viscosity of the polyphenylene sulfide resin composition to be impregnated into the reinforcing fiber bundle(s) can be measured, using as the measurement apparatus, a capillary flow meter (Capilograph 1C, manufactured by Toyo Seiki Co., Ltd.) with an orifice having a diameter of 0.5 mm and a length of 5 mm, under the conditions of a temperature of 320° C. and a shear rate of 9,728 $sec^{-1}$ The melt viscosity of the polyphenylene sulfide resin composition is preferably 120 Pa·s or less, more preferably 100 Pa·s or less, and still more preferably 70 Pa·s or less. When the melt viscosity is 120 Pa·s or less, an excellent resin impregnation into the reinforcing fiber bundles can be achieved, and it is possible to effectively prevent a decrease in mechanical strength and a decrease in surface quality associated with an increase in void fraction.

The fiber-reinforced resin base material has excellent high temperature bending strain properties. As an index thereof, the fiber-reinforced resin base material preferably has a bending strain (measured at 110° C., using a tensile testing machine, Instron 5565, equipped with a thermostatic chamber) of a molded specimen in accordance with ASTM D790 of 1.1% or more, and more preferably 1.2% or more. When the above-described bending strain is within the preferred range described above, the fiber-reinforced base material has an excellent heat resistance.

The polyphenylene sulfide resin composition is preferably a polyphenylene sulfide resin composition which contains 99 to 60% by weight of the polyphenylene sulfide resin (A), and 1 to 40% by weight of the thermoplastic resin (B) having a glass-transition temperature of 100° C. or higher, with respect to 100% by weight of the total amount of the polyphenylene sulfide resin (A) and the thermoplastic resin (B) having a glass-transition temperature of 100° C. or higher, wherein the thermoplastic resin component (B) having a glass-transition temperature of 100° C. or higher forms island phases, and wherein the thermoplastic resin component (B) having a glass-transition temperature of 100° C. or higher has a number average particle size of 10 μm or less.

While the glass-transition temperature as measured by the DMA method (tensile mode) of the polyphenylene sulfide resin composition is 110° C. or lower, the combination with the fiber-reinforced base material enables achievement of a glass-transition temperature as measured by the DMA method (bending mode) of the fiber-reinforced resin base material of 115° C. or higher, and to provide a high heat resistance. Accordingly, it is possible to provide a fiber-reinforced resin base material in which the heat resistance is significantly improved, without compromising the basic properties (chemical resistance, flame resistance and insulation property) of the polyphenylene sulfide resin (sometimes PPS). The reason for this is not clear at the moment, but it is thought to be as follows. The PPS resin composition is impregnated into each reinforcing fiber bundle having a certain distance between fibers, and a dense sea-island structure in which the PPS resin (A) forms a sea phase and the thermoplastic resin (B) having a glass-transition temperature of 100° C. or higher forms island phases, is formed between the respective fibers. In addition, the interface adhesion between the resin and the fibers is significantly improved. This is thought to have led to a drastic improvement in the heat resistance as the continuous fiber-reinforced resin base material.

The PPS resin (A) is a polymer containing a repeating unit represented by the following structural formula (I). From the viewpoint of heat resistance, the PPS resin (A) is preferably a polymer containing 70% by mole or more, more preferably 90% by mole or more, of the repeating unit represented by formula (I):

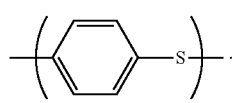

Further, about less than 30% by mole of repeating units in the PPS resin (A) may be composed, for example, of any of repeating units having the following structures:

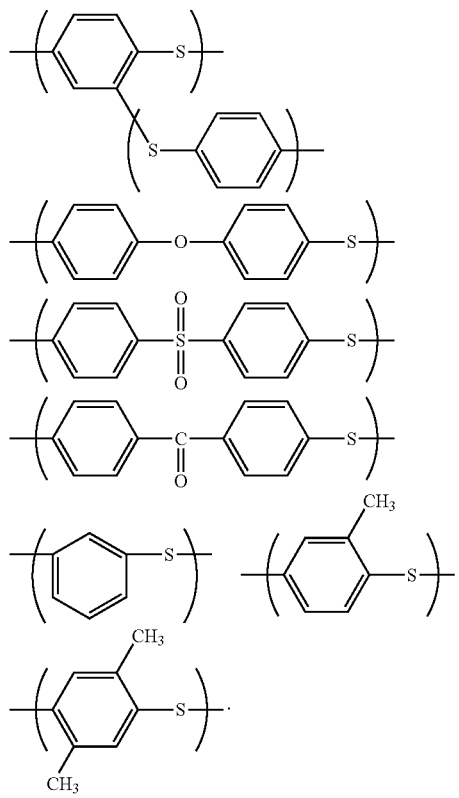

Since a PPS copolymer partially having such a structure(s) has a lower melting point, a resin composition containing such a copolymer is advantageous from the viewpoint of the formability.

Although not particularly limited, the PPS resin (A) preferably has a higher melt viscosity, from the viewpoint of obtaining a better toughness. For example, the PPS resin preferably has a melt viscosity of more than 80 Pa·s (at 310° C. and a shear rate of 1,000 sec$^{-1}$), more preferably 100 Pa·s or more, and still more preferably 150 Pa·s or more. The upper limit of the melt viscosity is preferably 600 Pa·s or less, from the viewpoint of maintaining the melt flowability.

The melt viscosity of the PPS resin (A) is a value measured under the conditions of a temperature of 310° C. and a shear rate of 1,000 sec$^{-1}$, using a Capilograph, manufactured by Toyo Seiki Co., Ltd.

An example of the method of producing the PPS resin (A) will now be described. However, the production method is not intended to be limited to the following method, as long as the PPS resin (A) having the structure described above can be obtained.

First, details regarding a polyhalogenated aromatic compound, a sulfidizing agent, a polymerization solvent, a molecular weight modifier, a polymerization modifier and a polymerization stabilizer to be used in the production method will be described.

Polyhalogenated Aromatic Compound

The "polyhalogenated aromatic compound" refers to a compound having two or more halogen atoms in one molecule. Specific examples of the polyhalogenated aromatic compounds include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene and 1-methoxy-2,5-dichlorobenzene. Among these, p-dichlorobenzene is preferably used. Further, two or more kinds of different polyhalogenated aromatic compounds can be used in combination, to form a copolymer, but it is preferred that a p-dihalogenated aromatic compound be contained as a main component.

The amount of the polyhalogenated aromatic compound used can be, for example, within the range of 0.9 to 2.0 moles, preferably 0.95 to 1.5 moles, and more preferably 1.005 to 1.2 moles, per 1 mole of the sulfidizing agent used, from the viewpoint of obtaining the PPS resin (A) having a viscosity suitable for processing.

Sulfidizing Agent

The sulfidizing agent may be, for example, an alkali metal sulfide, an alkali metal hydrosulfide or hydrogen sulfide.

Specific examples of the alkali metal sulfide include lithium sulfide, sodium sulfide, potassium sulfide, rubidium sulfide, cesium sulfide, and a mixture of two or more kinds thereof. Among these, sodium sulfide is preferably used. Each of these alkali metal sulfides can be used in the form of a hydrate or an aqueous mixture, or an anhydride.

Specific examples of the alkali metal hydrosulfide include sodium hydrosulfide, potassium hydrosulfide, lithium hydrosulfide, rubidium hydrosulfide, cesium hydrosulfide, and a mixture of two or more kinds thereof. Among these, sodium hydrosulfide is preferably used. Each of these alkali metal hydrosulfides can be used in the form of a hydrate or an aqueous mixture, or an anhydride.

Further, an alkali metal sulfide prepared in situ in the reaction system, from an alkali metal hydrosulfide and an alkali metal hydroxide can also be used. It is also possible to prepare an alkali metal sulfide from an alkali metal hydrosulfide and an alkali metal hydroxide, and to transfer the resulting alkali metal sulfide to a polymerization vessel for use.

Alternatively, an alkali metal sulfide prepared in situ in the reaction system, from an alkali metal hydroxide such as lithium hydroxide or sodium hydroxide, and hydrogen sulfide can also be used. It is also possible to prepare an alkali metal sulfide from an alkali metal hydroxide such as lithium hydroxide or sodium hydroxide, and hydrogen sulfide, and to transfer the resulting alkali metal sulfide to a polymerization vessel for use.

When a partial loss of the sulfidizing agent occurs before the start of the polymerization reaction due to the dehydration operation and the like, the charged amount of the sulfidizing agent as used herein refers to the remaining amount thereof, obtained by subtracting the amount of the loss from the actual charged amount.

It is also possible to use an alkali metal hydroxide and/or an alkaline earth metal hydroxide, in combination with the sulfidizing agent. Specific examples of preferred alkali metal hydroxides include sodium hydroxide, potassium hydroxide, lithium hydroxide, rubidium hydroxide, cesium hydroxide, and a mixture of two or more kinds thereof. Specific examples of alkaline earth metal hydroxides include calcium hydroxide, strontium hydroxide and barium hydroxide. Among these, sodium hydroxide is preferably used.

When using an alkali metal hydrosulfide as the sulfidizing agent, it is particularly preferred to use an alkali metal hydroxide at the same time. The amount of the alkali metal hydroxide used is 0.95 to 1.20 moles, preferably 1.00 to 1.15 moles, and more preferably 1.005 to 1.100 moles, per 1 mole of the alkali metal hydrosulfide.

Polymerization Solvent

As the polymerization solvent, it is preferred to use an organic polar solvent. Specific examples of the organic polar solvent include: N-alkyl pyrrolidones such as N-methyl-2-pyrrolidone and N-ethyl-2-pyrrolidone; caprolactams such as N-methyl-8-caprolactam; aprotic organic solvents typified by 1,3-dimethyl-2-imidazolidinone, N,N-dimethylacetamide, N,N-dimethylformamide, hexamethylphosphoric acid triamide, dimethyl sulfone and tetramethylene sulfoxide; and mixtures thereof. All of these solvents exhibit a high reaction stability, and thus are preferably used. Among these, N-methyl-2-pyrrolidone (sometimes NMP) is particularly preferably used.

The amount of the organic polar solvent used is 2.0 moles to 10 moles, preferably 2.25 to 6.0 moles, and more preferably 2.5 to 5.5 moles, per 1 mole of the sulfidizing agent.

Molecular Weight Modifier

For the purpose of forming an end of the PPS resin (A), or controlling the polymerization reaction or molecular weight or the like, a monohalogen compound (not necessarily needs to be an aromatic compound) can be used in combination with the polyhalogenated aromatic compound described above.

Polymerization Modifier

The use of a polymerization modifier is also one of the preferred examples to obtain the PPS resin (A) having a relatively high degree of polymerization in a shorter period of time. The "polymerization modifier" refers to a substance which has the effect of increasing the viscosity of the resulting PPS resin (A). Specific examples of such a polymerization modifier include an organic carboxylate, water, an alkali metal chloride, an organic sulfonate, an alkali metal sulfate, an alkaline earth metal oxide, an alkali metal phosphate and an alkaline earth metal phosphate. These can be used singly, or two or more kinds thereof can be used at the same time. Among these, an organic carboxylate, water and an alkali metal chloride are preferred. Further, the organic carboxylate is preferably an alkali metal carboxylate, and the alkali metal chloride is preferably lithium chloride.

The alkali metal carboxylate described above is a compound represented by the general formula: R(COOM)n (wherein R represents an alkyl group having from 1 to 20 carbon atoms, a cycloalkyl group, an aryl group, an alkylaryl group or an arylalkyl group; M represents an alkali metal selected from the group consisting of lithium, sodium, potassium, rubidium and cesium; and n is 1). The alkali metal carboxylate can also be used in the form of a hydrate, an anhydride or an aqueous solution. Specific examples of the alkali metal carboxylate include: lithium acetate, sodium acetate, potassium acetate, sodium propionate, lithium valerate, sodium benzoate, sodium phenylacetate and potassium p-toluate; and mixtures thereof.

The alkali metal carboxylate may also be formed by mixing roughly equal chemical equivalents of an organic acid, and one or more compounds selected from the group consisting of an alkali metal hydroxide, an alkali metal carbonate and an alkali metal bicarbonate, and allowing a reaction to occur. Among the alkali metal carboxylates described above, it is thought that lithium salts are expensive, although having a high solubility in the reaction system and a high effect as an auxiliary agent, and that potassium, rubidium and cesium salts have an insufficient solubility in the reaction system. Therefore, sodium acetate which is inexpensive and which has a moderate solubility in the polymerization system is most preferably used.

When using such an alkali metal carboxylate as the polymerization modifier, the amount thereof to be used is usually 0.01 moles to 2 moles with respect to 1 mole of the alkali metal sulfide charged. From the viewpoint of obtaining a higher degree of polymerization, the amount of the alkali metal carboxylate to be used is preferably 0.1 to 0.6 moles, and more preferably 0.2 to 0.5 moles.

When using water as the polymerization modifier, the amount thereof to be added is usually 0.3 moles to 15 moles with respect to 1 mole of the alkali metal sulfide charged. From the viewpoint of obtaining a higher degree of polymerization, the amount of water to be added is preferably 0.6 to 10 moles, and more preferably 1 to 5 moles.

It is of course possible to use two or more kinds of these polymerization modifiers in combination. For example, when an alkali metal carboxylate and water are used in combination, an increase in the molecular weight can be achieved by using smaller amounts of both.

The time point at which such a polymerization modifier is added is not particularly limited. The polymerization modifier may be added at any of the time points at the time of a preprocessing step to be described later, at the time of initiating polymerization and during the polymerization, or may be added in a plurality of times in divided portions. When using an alkali metal carboxylate as the polymerization modifier, however, it is more preferred to add it at the same time as the time of initiating the preprocessing step or the time of initiating the polymerization, because of ease of addition. Further, when water is used as the polymerization modifier, it is effective to add it after charging the polyhalogenated aromatic compound, and in the midst of the polymerization reaction.

Polymerization Stabilizer

To stabilize the polymerization reaction system and prevent side reactions, a polymerization stabilizer can also be used. The polymerization stabilizer contributes to stabilizing the polymerization reaction system, and reducing undesired side reactions. One of the indices indicating the occurrence of side reactions is, for example, the formation of thiophenol, and the formation of thiophenol can be reduced by the addition of the polymerization stabilizer. Specific examples of the polymerization stabilizer include compounds such as alkali metal hydroxides, alkali metal carbonates, alkaline earth metal hydroxides and alkaline earth metal carbonates. Among these, alkali metal hydroxides such as sodium hydroxide, potassium hydroxide and lithium hydroxide are preferred. The above-described alkali metal carboxylate also acts as the polymerization stabilizer, and thus is deemed as one kind of the polymerization stabilizer. It has been described above that, when using an alkali metal hydrosulfide as the sulfidizing agent, it is particularly preferred to use an alkali metal hydroxide at the same time. The alkali metal hydroxide used in excess with respect to the amount of the sulfidizing agent can also act as the polymerization stabilizer.

These polymerization stabilizers can be used singly, or in combination of two or more kinds thereof. The polymerization stabilizer is used usually in an amount of 0.02 to 0.2 moles, more preferably 0.03 to 0.1 moles, and still more preferably 0.04 to 0.09 moles, with respect to 1 mole of the alkali metal sulfide charged. When the polymerization stabilizer is used within the preferred proportion as described above, a sufficient stabilization effect can be obtained, and there is no risk that the polymer yield will be decreased.

The time point at which such a polymerization stabilizer is added is not particularly limited. The polymerization stabilizer may be added at any of the time points at the time of the preprocessing step to be described later, at the time of initiating polymerization and during the polymerization, or may be added in a plurality of times in divided portions. However, it is more preferred to add it at the same time as the time of initiating the preprocessing step or the time of initiating the polymerization, because of ease of addition.

Next, the method of producing the PPS resin (A) will be described specifically, in the order of a preprocessing step, a polymerization reaction step, a recovery step, and a post-processing step.

Preprocessing Step

In the method of producing the PPS resin (A), the sulfidizing agent is usually used in the form of a hydrate, and it is preferred to heat a mixture containing an organic polar solvent and the sulfidizing agent to remove an excessive amount of water out of the system, before adding the polyhalogenated aromatic compound.

Further, as described above, it is possible to use a sulfidizing agent prepared in situ in the reaction system, from an alkali metal hydrosulfide and an alkali metal hydroxide, or one prepared therefrom in a vessel separate from the polymerization vessel, as the sulfidizing agent. The method of preparing such a sulfidizing agent is not particularly limited. However, the sulfidizing agent may desirably be prepared, for example, by a method in which an alkali metal hydrosulfide and an alkali metal hydroxide are added to an organic polar solvent within the temperature range of from normal temperature to 150° C., preferably from normal temperature to 100° C., in an inert gas atmosphere, and the resultant is heated at least to a temperature of 150° C. or higher, preferably from 180 to 260° C., under normal pressure or reduced pressure, to remove moisture by distillation. The polymerization modifier may be added at this stage. In addition, toluene or the like may be added to carry out the reaction to accelerate the removal of moisture by distillation.

The amount of moisture in the polymerization system, in the polymerization reaction, is preferably 0.3 to 10.0 moles per 1 mole of the sulfidizing agent charged. The "amount of moisture in the polymerization system" refers to the amount obtained by subtracting the amount of moisture removed out of the polymerization system, from the amount of moisture charged into the polymerization system. Further, the water to be charged may be in any form such as in the form of water, an aqueous solution, or crystal water.

Polymerization Reaction Step

The PPS resin (A) is produced by allowing the sulfidizing agent to react with the polyhalogenated aromatic compound in an organic polar solvent, within the temperature range of 200° C. or higher and less than 290° C.

At the time of initiating the polymerization reaction step, the organic polar solvent, the sulfidizing agent and the polyhalogenated aromatic compound are mixed, preferably in an inert gas atmosphere, and preferably within the temperature range of from normal temperature to 240° C., more preferably from 100 to 230° C. The polymerization modifier may be added at this stage. These raw materials may be charged in an arbitrary order, or may be charged simultaneously.

The resulting mixture is heated usually to a temperature of 200° C. to 290° C. The temperature rise rate at this time is not particularly limited, but a rate of 0.01 to 5° C./min is usually selected, and a rate 0.1 to 3° C./min is more preferred.

In general, the mixture is heated to a final temperature of 250 to 290° C., and allowed to react at that temperature usually for a period of time 0.25 to 50 hours, preferably 0.5 to 20 hours.

To obtain a higher degree of polymerization, a method is effective in which the mixture is allowed to react at a stage before reaching the final temperature, for example, at a temperature of 200° C. to 260° C. for certain period of time, and then heated to 270 to 290° C. At this time, a period of time within the range of 0.25 hours to 20 hours is usually selected, and 0.25 to 10 hours is preferably selected, as the reaction time at a temperature of 200° C. to 260° C.

To obtain a polymer with an even higher degree of polymerization, it is effective to perform polymerization in a plurality of stages. In performing polymerization in a plurality of stages, it is effective to be performed at the time point where the conversion rate of the polyhalogenated aromatic compound in the system at 245° C. has reached 40% by mole or more, preferably 60% by mole.

The conversion rate of the polyhalogenated aromatic compound (PHA) is a value calculated by either of the following equations. The remaining amount of PHA can be determined usually by gas chromatography.

(a) When the polyhalogenated aromatic compound was added in excess with respect to the amount of the alkali metal sulfide, in molar ratio:

Conversion rate=[charged amount of PHA (moles)−remaining amount of PHA (moles)]/[charged amount of PHA (moles)−amount of PHA (moles) in excess].

(b) In other than the (a) above:

Conversion rate=[charged amount of PHA (moles)−remaining amount of PHA (moles)]/[charged amount of PHA (moles)].

Recovery Step

In the method of producing the PPS resin (A), solids are recovered from the resulting polymerization reaction product containing the polymer, the solvent and the like, after the completion of the polymerization. The PPS resin (A) may be recovered by any known recovery method.

For example, a method of slowly cooling the polymerization reaction product after the completion of the polymerization reaction, to recover a particulate polymer, may be used. The rate of slow cooling at this time is not particularly limited, and is usually about 0.1° C./min to 3° C./min. It is not necessary to perform slow cooling at the same rate throughout the entire process of the slow cooling, and a method may be used, for example, in which slow cooling is performed at a rate of 0.1 to 1° C./min until polymer particles are crystallized and precipitated, and thereafter, at a rate of 1° C./min or more.

Further, performing the above-described recovery under quenching conditions is one of the preferred methods. One example of the preferred recovery methods is the flush method. The flush method is a recovery method in which the polymerization reaction product in a state of high temperature and high pressure (usually 250° C. or higher and 8 kg/cm² or more) is flashed into an atmosphere under normal pressure or reduced pressure, to recover the polymer in the form of powder, simultaneously with the recovery of the solvent. The expression "to flash" means to allow the polymerization reaction product to spurt from a nozzle. Specifically, the atmosphere into which the polymerization reaction product is flashed may be, for example, a nitrogen or water vapor atmosphere under normal pressure, and a temperature of 150° C. to 250° C. is usually selected as the temperature of the atmosphere.

Post-Processing Step

The PPS resin (A) may be one which has been subjected to an acid treatment, a hot-water treatment or washing with an organic solvent, after the formation thereof through the polymerization and the recovery steps described above.

Preferred conditions in performing the acid treatment are as follows. The acid to be used in the acid treatment of the PPS resin (A) is not particularly limited, as long as the acid does not have the effect of decomposing the PPS resin (A). Examples of the acid include acetic acid, hydrochloric acid, sulfuric acid, phosphoric acid, silicic acid, carbonic acid and propyl acid. Among these, acetic acid and hydrochloric acid are more preferably used. An acid which causes the decomposition or degradation of the PPS resin (A) such as nitric acid should be avoided.

The acid treatment can be carried out, for example, by a method of immersing the PPS resin (A) in an acid or an aqueous solution of an acid, and it is also possible to perform stirring or heating as appropriate, if necessary. For example, when using acetic acid, a sufficient effect can be obtained by immersing the powder of the PPS resin in a pH 4 aqueous solution of acetic acid heated to a temperature of 80 to 200° C., and stirring for 30 minutes. The pH after the treatment may be 4 or more, for example, a PH of about 4 to 8. The PPS resin (A) subjected to the acid treatment is preferably washed several times with water or warm water to remove the residual acid, salt or the like. The water to be used for washing is preferably distilled water or deionized water not to impair the effect of preferred chemical modification of the PPS resin (A) by the acid treatment.

Preferred conditions in performing the hot-water treatment are as follows. At the time of subjecting the PPS resin (A) to the hot-water treatment, the temperature of hot water is preferably adjusted to 100° C. or higher, more preferably to 120° C. or higher, still more preferably to 150° C. or higher, and particularly preferably to 170° C. or higher. When the temperature of hot water is adjusted within the preferred range described above, the effect of preferred chemical modification of the PPS resin (A) can be sufficiently obtained.

To obtain the effect of preferred chemical modification of the PPS resin (A) by hot water washing, the water to be used is preferably distilled water or deionized water. The operation for the hot-water treatment is not particularly limited. The hot-water treatment is carried out, for example, by a method of introducing a predetermined amount of the PPS resin (A) into a predetermined amount of water, and heating and stirring the resultant in a pressure vessel, or a method of continuously performing hot-water treatment. As to the ratio of the PPS resin (A) and water, the proportion of water is preferably higher than that the PPS resin. In general, a liquor ratio of 200 g or less of the PPS resin (A) with respect to 1 liter of water is selected.

The hot-water treatment is preferably carried out in an inert atmosphere to avoid the decomposition of terminal groups. Further, the PPS resin (A) after the completion of the hot-water treatment operation is preferably washed several times with warm water to remove the residual components.

Preferred conditions when washing the PPS resin (A) with an organic solvent are as follows. The organic solvent to be used for washing the PPS resin (A) is not particularly limited, as long as the solvent does not have the effect of decomposing the PPS resin (A) and the like. Examples of the organic solvent include: nitrogen-containing polar solvents such as N-methyl-2-pyrrolidone, dimethylformamide, dimethylacetamide, 1,3-dimethylimidazolidinone, hexamethylphosphoramide and piperazinones; sulfoxide and sulfone solvents such as dimethyl sulfoxide, dimethyl sulfone and sulfolane; ketone solvents such as acetone, methyl ethyl ketone, diethyl ketone and acetophenone; ether solvents such as dimethyl ether, dipropyl ether, dioxane and tetrahydrofuran; halogen solvents such as chloroform, methylene chloride, trichloroethylene, ethylene dichloride, perchloroethylene, monochloroethane, dichloroethane, tetrachloroethane, perchloroethane and chlorobenzene; alcohol and phenol solvents such as methanol, ethanol, propanol, butanol, pentanol, ethylene glycol, propylene glycol, phenol, cresol, polyethylene glycol and polypropylene glycol; and aromatic hydrocarbon solvents such as benzene, toluene and xylene. Among these organic solvents, the use of N-methyl-2-pyrrolidone, acetone, dimethylformamide and chloroform and the like are particularly preferred. These organic solvents can be used singly, or as a mixture of two or more kinds thereof.

The washing with an organic solvent can be carried out, for example, by a method of immersing the PPS resin (A) in the organic solvent, and it is also possible to perform stirring or heating as appropriate, if necessary. The washing temperature for washing the PPS resin (A) with the organic solvent is not particularly limited, and an arbitrary temperature of from normal temperature to about 300° C. can be selected. While a higher washing temperature tends to result in a higher washing efficiency, a sufficient washing effect can be obtained usually with a washing temperature of from normal temperature to 150° C. It is also possible to perform washing in a pressure vessel, at a temperature equal to or higher than the boiling point of the organic solvent, and under pressure. The washing time is not particularly limited, as well. Although it varies depending on the washing conditions, a sufficient effect can be obtained usually by washing 5 minutes or more in performing washing in a batch process. It is also possible to perform washing in a continuous process.

The PPS resin (A) can also be subjected to a heat oxidation crosslinking treatment by heating in an oxygen atmosphere and heating with the addition of a crosslinking reagent such as a peroxide, after the completion of the polymerization, to achieve an increase in the molecular weight thereof, before use.

When performing a dry heat treatment for the purpose of achieving an increase in the molecular weight by heat oxidation crosslinking, the treatment is preferably carried out at a temperature of 160 to 260° C., and more preferably 170 to 250° C. The oxygen concentration in the dry heat treatment is desirably adjusted to 5% by volume or more, more desirably 8% by volume or more. Although the upper limit of the oxygen concentration is not particularly limited, about 50% by volume is the limit. The treatment time is preferably 0.5 to 100 hours, more preferably 1 to 50 hours, and sill more preferably 2 to 25 hours. The apparatus to be used in the heat treatment may be a common hot air dryer, or a rotary heating apparatus or a heating apparatus with a stirring blade. However, when it is intended to perform the treatment efficiently and more homogeneously, it is more preferred to use a rotary heating apparatus or a heating apparatus with a stirring blade.

Further, it is also possible to perform a dry heat treatment for the purpose of reducing the heat oxidation crosslinking and removing volatile components. The dry heat treatment is preferably carried out at a temperature of 130 to 250° C., and more preferably 160 to 250° C. The oxygen concentration in this instance is preferably adjusted to less than 5% by volume, and more preferably less than 2% by volume. The treatment time is preferably 0.5 to 50 hours, more preferably 1 to 20 hours, and still more preferably 1 to 10 hours. The apparatus to be used in the heat treatment may be a common hot air dryer, or a rotary heating apparatus or a heating apparatus with a stirring blade. However, when it is intended to perform the treatment efficiently and more homogeneously, it is more preferred to use a rotary heating apparatus or a heating apparatus with a stirring blade.

However, to achieve the intended toughness, it is preferred not to increase the molecular weight of the PPS resin (A) by the heat oxidation crosslinking treatment. That is, the PPS resin (A) is preferably substantially a linear PPS.

The type of the thermoplastic resin (B) having a glass-transition temperature of 100° C. or higher is not particularly limited. The thermoplastic resin (B) to be used is preferably a polyimide, a polyarylketone, a polysulfone, a polyarylate, a polyphenyleneether, a polycarbonate, a polyetherimide, a polyethersulfone, a polyphenyl sulfone, a polysulfone, a polyamideimide or a liquid crystal polymer. An amorphous resin such as a polyetherimide, a polyethersulfone, a polyphenyl sulfone, a polysulfone or a polyphenyleneether is more preferred, and a polyetherimide or a polyethersulfone is particularly preferred.

The glass-transition temperatures of the components (A) and (B) can be determined by the melting temperature pseudo-isothermal method. In the melting temperature pseudo-isothermal method, each glass-transition temperature was calculated by the following equation, using a temperature-modulated DSC (manufactured by TA Instruments, Inc.), and in accordance with JIS K 7121:

Glass-transition temperature=(extrapolated glass transition start temperature+extrapolated glass transition end temperature).

Polyetherimide Resin and Polyethersulfone Resin

The polyetherimide resin is a resin containing an imide bond and an ether bond in the repeating skeleton. The following can be exemplified as a typical structure:

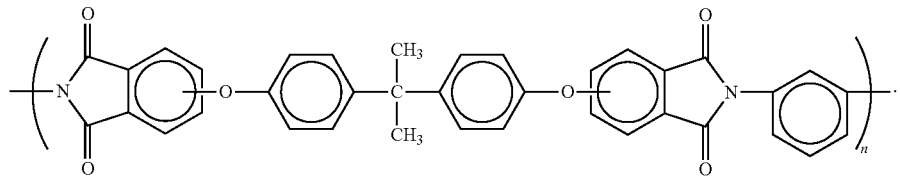

Such a resin is generally commercially available from General Electric Company, under the trademark of "ULTEM" (registered trademark).

The polyethersulfone resin is a resin containing a sulfone bond and an ether bond in the repeating skeleton. The following can be exemplified as a typical structure:

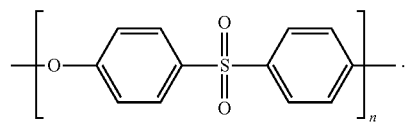

Such resins are generally commercially available, under the trademarks of "VICTREX" (registered trademark) PES and "SUMIKAEXCEL" (registered trademark).

When the polyetherimide resin and the polyethersulfone resin are compared, the polyetherimide resin is capable of achieving a higher toughness in a smaller amount, and thus is preferred.

The mixing ratio (A)/(B) of the PPS resin (A) to the thermoplastic resin (B) having a glass-transition temperature of 100° C. or higher is preferably 99 to 60% by weight/1 to 40% by weight, more preferably 97 to 70% by weight/3 to 30% by weight, and still more preferably 95 to 80% by weight/5 to 20% by weight. When the mixing ratio (A)/(B) is within the preferred range described above, an excellent effect of improving the toughness and an excellent melt flowability can be obtained.

The PPS resin composition has an excellent toughness, along with an excellent heat resistance, chemical resistance and barrier properties inherent in the PPS resin (A). To exhibit such properties, it is preferred that the PPS resin (A) form a sea phase (continuous phase or matrix), and the thermoplastic resin (B) having a glass-transition temperature of 100° C. or higher form island phases (dispersed phases). Further, the thermoplastic resin component (B) having a glass-transition temperature of 100° C. or higher preferably has a number average dispersion particle size of 10 μm or less, more preferably 1 μm or less, and still more preferably 500 nm or less. The lower limit of the number average dispersion particle size of the thermoplastic resin component (B) having a glass-transition temperature of 100° C. or higher is preferably 1 nm or more, from the viewpoint of productivity. When the number average dispersion particle size of the thermoplastic resin component (B) having a glass-transition temperature of 100° C. or higher is within the range of more than 10 μm, the effect of improving the toughness is significantly impaired, and thus is not preferred. The excellent chemical resistance and flame resistance properties of the PPS resin (A) can be greatly reflected on the properties of the resulting composition, when the PPS resin (A) forms a continuous phase.

The "average dispersion particle size" refers to the number average dispersion particle size determined as follows. Specifically, an ASTM No. 4 test specimen is formed at a forming temperature which is the melt peak temperature of the PPS resin (A)+20° C., a thin slice with a thickness of 0.1 μm or less is cut out from the center portion of the dumbbell-shaped specimen at −20° C., in the direction of the cross-sectional area thereof, and the thin slice is observed at a magnification of 10,000 to 20,000 times, using a H-7100 transmission electron microscope, manufactured by Hitachi, Ltd. (resolution (particle image): 0.38 nm, magnification: 500,000 to 600,000 times). In the thus observed image, 100 pieces of the dispersed portions of the thermoplastic resin (B) having a glass-transition temperature of 100° C. or higher are randomly selected, the maximum diameters and the minimum diameters of the respective portions are first measured, the mean values thereof are determined as the dispersion particle sizes, and then the mean value of the dispersion particle sizes is determined as the number average dispersion particle size.

Compound (C) Having One or More Groups Selected from the Group Consisting of Epoxy, Amino and Isocyanate Groups It is preferred to add a compound (C) having one or more groups selected from the group consisting of epoxy, amino and isocyanate groups, as a compatibilizer, for the purpose of further improving the interface adhesion between the resin and the reinforcing fibers.

Examples of the epoxy group-containing compound include: glycidyl ethers of bisphenols such as bisphenol A, resorcinol, hydroquinone, pyrocatechol, bisphenol F, saligenin, 1,3,5-trihydroxybenzene, bisphenol S, trihydroxydiphenyldimethylmethane, 4,4'-dihydroxybiphenyl, 1,5-dihydroxynaphthalene, cashew phenol and 2,2,5,5,-tetrakis(4-hydroxyphenyl)hexane; the above-described glycidyl ethers in which halogenated bisphenols are used instead of bisphenols; glycidyl epoxy resins, including glycidyl ether-based epoxy compounds such as diglycidyl ether of butanediol, glycidyl ester-based compounds such as phthalic acid glycidyl ester, and glycidyl amine-based compounds such as N-glycidyl aniline; linear epoxy compounds such as epoxidized polyolefins and epoxidized soybean oils; and cyclic non-glycidyl epoxy resins such as vinylcyclohexene dioxide and dicyclopentadiene dioxide.

In addition, the epoxy group-containing compound may be, for example, a novolac epoxy resin. The novolac epoxy resin is a resin which has two or more epoxy groups, and which is usually obtained by allowing a novolac phenolic resin to react with epichlorohydrin. Further, the novolac phenolic resin is obtained by a condensation reaction of a phenol and formaldehyde. The phenol as a raw material is not particularly limited, and examples thereof include: phenol, o-cresol, m-cresol, p-cresol, bisphenol A, resorcinol, p-tertiary butyl phenol, bisphenol F and bisphenol S; and condensation products thereof.

Examples of the amino group-containing compound include alkoxysilanes containing amino groups. Specific examples of such compounds include amino group-containing alkoxysilane compounds such as γ-(2-aminoethyl)aminopropylmethyldimethoxysilane, γ-(2-aminoethyl)aminopropyltrimethoxysilane and γ-aminopropyltrimethoxysilane.

Examples of the compound containing one or more isocyanate groups include: isocyanate compounds such as 2,4-tolylene diisocyanate, 2,5-tolylene diisocyanate, diphenylmethane-4,4'-diisocyanate and polymethylene polyphenyl polyisocyanate; and isocyanate group-containing alkoxysilane compounds such as γ-isocyana- tepropyltriethoxysilane, γ-isocyanatepropyltrimethoxysilane, γ-isocyanatepropylmethyldimethoxysilane, γ-isocyanatepropylmethyldiethoxysilane, γ-isocyanatepropylethyldimethoxysilane, γ-isocyanatepropylethyldiethoxysilane, and γ-isocyanatepropyltrichlorosilane.

Among these, at least one compound selected from a compound containing one or more isocyanate groups or a compound containing two or more epoxy groups is preferred, and a compound containing one or more isocyanate groups is more preferred to drastically improve the interface adhesion between the resin and the reinforcing fibers.

The amount of the component (C) to be mixed is 0.05 to 10 parts by weight, preferably 0.1 to 5 parts by weight, and more preferably 0.2 to 3 parts by weight, with respect to 100 parts by weight of the total amount of the PPS resin (A) and the thermoplastic resin (B) having a glass-transition temperature of 100° C. or higher.

The heat resistance of the fiber-reinforced resin base material can be drastically improved, by decreasing the number average dispersion particle size of the thermoplastic resin component (B) having a glass-transition temperature of 100° C. or higher, which forms the island phases in the polyphenylene sulfide resin composition forming the above-described sea-island structure, smaller than the distance between reinforcing fibers represented by equation (1):

$$z = y - 2r \quad (1)$$

z: distance between reinforcing fibers, y: distance between centers of reinforcing fibers, r: fiber radius.

The polyphenylene sulfide resin composition to be impregnated into the reinforcing fiber bundle(s) is usually obtained by melt kneading. Examples of typical methods include a method in which raw materials are fed to a commonly known melt kneader such as a single-screw extruder, a twin-screw extruder, a Banbury mixer, a kneader or a mixing roll, and kneaded at a processing temperature which is the melt peak temperature of the resin composition +5 to 100° C. At this time, the order of mixing the raw materials is not particularly limited, and the mixing may be performed by any of the following methods: a method of mixing all the raw materials, followed by melt kneading by the method described above; a method of mixing a part of the raw materials, followed by melt kneading by the method described above, and then mixing the remaining raw materials, further followed by melt kneading; and a method of mixing a part of the raw materials, and then, while melt kneading the mixture by a single-screw extruder or a twin-screw extruder, mixing the remaining raw materials through the side feeder of the extruder. Further, it is of course possible to add a component(s) to be added in a small amount(s), at a time point after other components are kneaded by the above method or the like and pelletized, and before being subjected to molding.

Further, any of the following compounds can be added, for the purpose of modification. Examples of compounds which can be added include: plasticizers such as polyalkylene oxide oligomer-based compounds, thioether-based compounds, ester-based compounds and organic phosphorus compounds; crystal nucleating agents such as organic phosphorus compounds and polyether ether ketones; metal soaps such as montanic acid waxes, lithium stearate and aluminum stearate; release agents such as ethylenediamine/stearic acid/sebacic acid polycondensates and silicone-based compounds; color-protection agents such as hypophosphite; phenolic antioxidants such as (3,9-bis[2-(3-(3-t-butyl-4-hydroxy-5-methylphenyl)propionyloxy)-1,1-dimethylethyl]-2,4,8,10-tetraoxaspiro[5,5]undecane); and phosphorus-based antioxidants such as (bis(2,4-di-cumylphenyl)pentaerythritol-diphosphite). In addition, it is also possible to add any commonly used additives such as water, lubricants, ultraviolet absorbers, coloring agents and foaming agents. When any of the compounds described above are added in amount of more than 20% by weight with respect to the total amount of the composition, the original properties of the resin are impaired, and thus is not preferred. Therefore, the added amount thereof is preferably 10% by weight or less, and more preferably 1% by weight or less.

The fiber-reinforced resin base material can be obtained by impregnating continuous reinforcing fibers with the thermoplastic resin (the first example). Alternatively, the fiber-reinforced resin base material can be obtained by impregnating a reinforcing fiber base material in which discontinuous reinforcing fibers are dispersed, with the thermoplastic resin (the second example).

Examples of the method of impregnating continuous reinforcing fibers with the thermoplastic resin, in the first example, include: the film method in which the thermoplastic resin in the form of a film is melted and pressurized to impregnate the reinforcing fiber bundle(s) with the thermoplastic resin; the commingling method in which the thermoplastic resin in a fibrous form and the reinforcing fiber bundle(s) are subjected to mixed spinning, and then the thermoplastic resin in a fibrous form is melted and pressurized to impregnate the reinforcing fiber bundle(s) with the thermoplastic resin; the powder method in which the thermoplastic resin in the form of powder is dispersed in the gaps between fibers in the reinforcing fiber bundle(s), and then the thermoplastic resin in the form of powder is melted and pressurized to impregnate the reinforcing fiber bundle(s) with the thermoplastic resin; and the drawing method in which the reinforcing fiber bundle(s) are immersed in the thermoplastic resin which has been melted, and pressurized to impregnate the reinforcing fiber bundle(s) with the thermoplastic resin. Among these, the drawing method is preferred, because it allows for producing a variety of types of fiber-reinforced resin base materials varying in thickness and fiber volume fraction.

The fiber-reinforced resin base material in the first example preferably has a thickness of 0.1 to 10 mm. When the fiber-reinforced resin base material has a thickness of 0.1 mm or more, the strength of a molded article which can be obtained using the fiber-reinforced resin base material can be improved. The thickness of the fiber-reinforced resin base material is more preferably 0.2 mm or more. On the other hand, when the fiber-reinforced resin base material has a thickness of 1.5 mm or less, the reinforcing fibers are more easily impregnated with the thermoplastic resin. The thickness of the fiber-reinforced resin base material is more preferably 1 mm or less, still more preferably 0.7 mm or less, and yet still more preferably 0.6 mm or less.

The volume fraction of the reinforcing fibers in the fiber-reinforced resin base material, in the first example, is preferably 20 to 70% by volume. In other words, the fiber-reinforced resin base material preferably contains 20 to 70% by volume (20% by volume or more and 70% by volume or less) of the reinforcing fibers with respect to the total volume (100% by volume) of the fiber-reinforced resin base material. When the fiber-reinforced resin base material contains 20% by volume or more of the reinforcing fibers, the strength of a molded article which can be obtained using the fiber-reinforced resin base material can further be improved. The volume fraction of the reinforcing fibers is more preferably 30% by volume or more, and still more preferably 40% by volume or more. On the other hand, when the fiber-reinforced resin base material contains 70% by volume or less of the reinforcing fibers, the reinforcing fibers are more easily impregnated with the thermoplastic resin. The volume fraction of the reinforcing fibers is more preferably 60% by volume or less, and more preferably 55% by volume or less. The volume fraction of the reinforcing fibers can be adjusted to a desired range, by adjusting the amounts of the reinforcing fibers and the thermoplastic resin to be incorporated.

The volume fraction (Vf) of the reinforcing fibers in the fiber-reinforced resin base material can be determined by: measuring the mass $W_0$ of the fiber-reinforced resin base material; then heating the fiber-reinforced resin base material in air at 50° C. for 240 minutes, to burn off the thermoplastic resin component; measuring the mass $W_1$ of the remaining reinforcing fibers; and calculating in accordance with equation (3):

$$\text{Vf (\% by volume)}=(W_1/\rho f)/\{W_1/\rho f+(W_0-W_1)/\rho r\}\times 100 \qquad (3)$$

$\rho f$: density (g/cm³) of reinforcing fiber
$\rho r$: density (g/cm³) of thermoplastic resin.

Further, in the fiber-reinforced resin base material, desired impregnation properties can be selected depending on the application or the purpose thereof. The fiber-reinforced resin base material may be, for example, a prepreg with higher impregnation, a semipreg which is semi-impregnated, a fabric with low impregnation, or the like. In general, a molding material with higher impregnation is preferred, because it allows for producing a molded article having excellent mechanical properties, in a short molding time.

Examples of the method of impregnating a reinforcing fiber base material in which discontinuous fibers are dispersed, with the thermoplastic resin, in the second example, include: a method of supplying the thermoplastic resin by an extruder to impregnate the reinforcing fiber base material with the thermoplastic resin; a method in which the thermoplastic resin in the form of powder is dispersed and melted in the fiber layer of the reinforcing fiber base material; a method of forming the thermoplastic resin into a film, and laminating the film with the reinforcing fiber base material; a method of dissolving the thermoplastic resin in a solvent, and impregnating the reinforcing fiber base material with the resin in the form of a solution, followed by vaporizing the solvent; a method of forming the thermoplastic resin into fibers to form a commingled yarn with discontinuous fibers; a method of impregnating the reinforcing fiber base material with a precursor of the thermoplastic resin, followed by polymerization to form the thermoplastic resin; and a method of laminating using a melt-blown nonwoven fabric. Any of the above-described methods can be used. However, the method of supplying the thermoplastic resin by an extruder to impregnate the reinforcing fiber base material with the thermoplastic resin, has an advantage that there is no need to subject the thermoplastic resin to secondary processing. The method in which the thermoplastic resin in the form of powder is dispersed and melted in the fiber layer of the reinforcing fiber base material, has an advantage that impregnation can be performed easily. Further, the method of forming the thermoplastic resin into a film, and laminating the film with the reinforcing fiber base material, has an advantage that a fiber-reinforced resin base material having a relatively good quality can be obtained.

The fiber-reinforced resin base material in the second example preferably has a thickness of 0.1 to 10 mm. When the fiber-reinforced resin base material has a thickness of 0.1 mm or more, the strength of a molded article which can be obtained using the fiber-reinforced resin base material can be improved. The thickness of the fiber-reinforced resin base material is more preferably 1 mm or more. On the other hand, when the fiber-reinforced resin base material has a thickness of 10 mm or less, the reinforcing fibers are more easily impregnated with the thermoplastic resin. The thickness of the fiber-reinforced resin base material is more preferably 7 mm or less, and still more preferably 5 mm or less.

The volume fraction of the reinforcing fibers in the fiber-reinforced resin base material in the second example is preferably 20 to 70% by volume. In other words, the fiber-reinforced resin base material preferably contains 20% by volume or more and 70% by volume or less of the discontinuous fibers with respect to the total volume (100% by volume) of the fiber-reinforced resin base material. When the fiber-reinforced resin base material contains 20% by volume or more of the discontinuous fibers, the strength of a molded article which can be obtained using the fiber-reinforced resin base material can further be improved. The volume fraction of the discontinuous fibers is more preferably 30% by volume or more. On the other hand, when the fiber-reinforced resin base material contains 70% by volume or less of the discontinuous fibers, the discontinuous fibers are more easily impregnated with the thermoplastic resin. The volume fraction of the discontinuous reinforcing fibers is more preferably 60% by volume or less, and still more preferably 50% by volume or less. The volume fraction (Vf) described above can be calculated in accordance with the equation (3) described above.

Further, in the fiber-reinforced resin base material according to the second example, desired impregnation properties can be selected depending on the application or the purpose thereof. In general, a molding material with higher impregnation is preferred, because it allows to produce a molded article having excellent mechanical properties, in a short molding time.

In the production of the fiber-reinforced resin base material in the second example, the fiber-reinforced resin base material can be adjusted to a desired thickness or fiber volume fraction, for example, by a method of heating and pressurizing using a press machine. The press machine is not particularly limited, as long as the temperature and the pressure required for the impregnation of the thermoplastic resin can be achieved. It is possible to use a common press machine including a planar platen capable of being raised and lowered, or a so-called double-belt press machine having a mechanism in which a pair of endless steel belts run.

A molded article can be obtained by laminating one or more pieces of the fiber-reinforced resin base materials in the first or the second example, in an arbitrary configuration, and then molding the resulting laminate while applying heat and/or pressure as necessary.

Examples of the method of applying heat and/or pressure include: the press molding method in which the fiber-reinforced resin base material(s) laminated in an arbitrary configuration is/are placed in a mold or between press plates, and then pressurized after closing the mold or the press plates; the autoclave molding method in which a molding material(s) laminated in an arbitrary configuration is/are placed in an autoclave, followed by pressurizing and heating; the bagging method in which the fiber-reinforced resin base material(s) laminated in an arbitrary configuration is/are wrapped with a film or the like, and heated in an oven while pressurizing at atmospheric pressure with the interior of the film being vacuumed; the wrapping tape method in which a tape is wound around the fiber-reinforced resin base material(s) laminated in an arbitrary configuration, while applying a tension, followed by heating in an oven; and the internal pressure molding method in which a fiber-reinforced terminal-modified polyamide resin material(s) laminated in an arbitrary configuration is/are placed in a mold, and a gas, a liquid or the like is injected into a core also placed in the mold, to pressurize the laminate. Above all, the molding method in which a mold is used to perform pressing is preferred, because it is possible to obtain a molded article having an excellent appearance quality with fewer voids.

As the press molding method, hot pressing or stamping molding can be used. In hot pressing, the fiber-reinforced resin base material(s) is/are placed in a mold in advance, pressurized and heated while tightening the mold, and then the mold is cooled while continuing tightening, to cool the fiber-reinforced resin base material(s), thereby obtaining a molded article. In stamping molding, the fiber-reinforced resin base material(s) is/are heated to a temperature equal to or higher than the melting temperature of the thermoplastic resin in advance, using a heating apparatus such as a far infrared heater, a hot platen, a high temperature oven or a dielectric heater; the resin base material(s) in which the thermoplastic resin is in a molten and softened state is/are placed on the lower mold surface of the forming mold; and then the mold is closed and tightened, followed by pressurizing and cooling. The press molding method is not particularly limited, but stamping molding is preferred from the viewpoint of increasing the speed of molding cycles and enhancing productivity.

Further, it is possible to integrate the fiber-reinforced resin base material in the first or the second example, and a molded article, by: integral molding such as insert molding or outsert molding; reforming by heating; an adhesion method excellent in productivity such as heat welding, vibration welding or ultrasonic welding; or a method using an adhesive; to obtain a composite.

The composite is preferably a composite molded article in which the fiber-reinforced resin base material in the first or the second example, and a molded article containing a thermoplastic resin are joined at least in one part.

The molded article (molding base material and molded article) containing a thermoplastic resin to be integrated with the fiber-reinforced resin base material in the first or the second example, is not particularly limited, and may be, for example, a resin material and a molded article, a metallic material and a molded article, or an inorganic material and a molded article. Among these, a resin material and a molded article are preferred from the viewpoint of improving the adhesion strength with the fiber-reinforced thermoplastic resin.

The matrix resin of the molding material and the molded article to be integrated with the fiber-reinforced resin base material in the first or the second example may be the same as, or different from, the type of the resin in the fiber-reinforced resin base material and a molded article thereof. To further enhance the adhesion strength, the same type of resin is preferred. In a different type of resin, it is more suitable to provide a resin layer at the interface.

EXAMPLES

Our materials will now be described in more specific detail, with reference to the following Examples. However, this disclosure is in no way limited to the descriptions in these Examples. In each of the following Examples and Comparative Examples, the physical properties are evaluated by the following methods.

Volume Fraction (Vf)

The volume fraction (Vf) of the reinforcing fibers in the fiber-reinforced resin base material was determined by: measuring the mass $W_0$ of the fiber-reinforced resin base material obtained in each of the Examples and Comparative Examples; then heating the fiber-reinforced resin base material in air at 550° C. for 240 minutes, to burn off the resin component; measuring the mass $W_1$ of the remaining reinforcing fibers; and calculating in accordance with the following equation (3):

$$\text{Vf (\% by volume)} = (W_1/\rho f)/\{W_1/\rho f + (W_0 - W_1)/\rho r\} \times 100 \quad (3)$$

ρf: density (g/cm³) of reinforcing fiber
ρr: density (g/cm³) of resin composition.

Measurement of Molecular Weight of Polymer

The molecular weight of the PPS resin (A) was measured by gel permeation chromatography (GPC), which is one kind of size exclusion chromatography (SEC), and calculated in terms of polystyrene. GPC measurement conditions are shown below:

Apparatus: ultra-high temperature GPC apparatus, SSC-7100, manufactured by Senshu Scientific Co., Ltd.
Column name: GPC 3506, manufactured by Senshu Scientific Co., Ltd.
Eluent: 1-chloronaphthalene
Detector: differential refractive index detector
Column temperature: 210° C.
Pre-thermostatic chamber temperature: 250° C.
Pump thermostatic chamber temperature: 50° C.
Detector temperature: 210° C.
Flow rate: 1.0 mL/min
Sample injection volume: 300 μL (sample concentration: about 0.2% by weight).

Flowability (Melt Viscosity) of Polymer

The polyphenylene sulfide resin composition obtained in each of the Examples and Comparative Examples was dried in a vacuum dryer at 100° C. for 12 hours or more. The melt viscosity (melt viscosity before retention) of each resulting resin composition was measured, using as the measurement apparatus, a capillary flow meter (Capilograph 1C, manufactured by Toyo Seiki Co., Ltd.) with an orifice having a diameter of 0.5 mm and a length of 5 mm, under the conditions of a temperature of 320° C. and a shear rate of 9,728 sec$^{-1}$. However, to melt the resin composition, the measurement was carried out after retaining the composition for 5 minutes. A smaller melt viscosity value indicates a higher flowability.

Heat Resistance of Polymer: DMA Method (Tensile Mode)

The pellets of the resin composition obtained in each of the Examples and Comparative Examples was formed into a pressed film sample having a width of 8 mm, a length of 40 mm and a thickness of 0.1 mm, at a processing temperature of the melting point+60° C. Thereafter, the storage modulus and the loss modulus of each sample were measured under the following measurement conditions, using a dynamic viscoelasticity measuring apparatus (DMS 6100), manufactured by Seiko Instruments Inc., and then the loss tangent (tan δ) (=loss modulus/storage modulus) was determined. Subsequently, a graph of the measurement temperature and the loss tangent was prepared for each sample, and the temperature(s) of the peak(s) in this graph was/were determined as the glass-transition temperature(s). The higher the thus measured glass-transition temperature(s), the better the heat resistance of the polymer.

Measurement mode: tensile mode
Temperature conditions: first step: maintained at 50° C. for 2 minutes, second step: raising from 30° C. to 250° C.
Temperature rise rate: 2° C./min
Measurement frequency: 1 Hz
Minimum tension: 200 mN
Strain amplitude: 10 μm
Tension gain: 1.5
Force amplitude initial value: 2,000 mN Heat Resistance of Composite Article: DMA Method (Bending Mode)

The fiber-reinforced resin base materials (unidirectional base materials having a width of 50 mm and a thickness of 0.08 mm) obtained in each of the Examples and Comparative Examples were laminated in the 0° direction, and press molded so as to achieve a thickness of 2 mm, to obtain a fiber-reinforced resin molded article. A sample in the form of a rectangular column having a width of 12 mm, a length of 20 mm and a thickness of 2 mm was cut out from each resulting molded article. Thereafter, the storage modulus and the loss modulus of each sample were measured under the following measurement conditions, using a dynamic viscoelasticity measuring apparatus (DMS 6100), manufactured by Seiko Instruments Inc., and then the loss tangent (tan δ) (=loss modulus/storage modulus) was determined. Subsequently, a graph of the measurement temperature and the loss tangent was prepared for each sample, and the temperature(s) of the peak(s) in this graph was/were determined as the glass-transition temperature(s). The higher the thus measured glass-transition temperature(s), the better the heat resistance of the composite article.

Measurement mode: bending mode
Temperature conditions: first step: maintained at 50° C. for 2 minutes, second step: raising from 30° C. to 250° C.
Temperature rise rate: 2° C./min
Measurement frequency: 1 Hz
Minimum tension: 200 mN
Strain amplitude: 10 μm
Tension/compression gain: 1.5
Force amplitude initial value: 2,000 mN Mechanical Properties of Composite Article (Tensile Test)

The fiber-reinforced resin base materials (unidirectional base materials having a width of 50 mm and a thickness of 0.08 mm) obtained in each of the Examples and Comparative Examples were laminated in the 0° direction, and press molded to achieve a thickness of 1.0 mm, a width of 100 mm and a length of 250 mm, to obtain a fiber-reinforced resin molded article. Rectangular samples for tensile test having a width of 15 mm, a length of 125 mm and a thickness of 1.0 mm were cut out from each resulting molded article, and tensile tests (n=5 each) were carried out in accordance with ASTM D3039. The higher the numerical values of the thus measured tensile strength and tensile elongation, the better the mechanical properties of the composite material.

Mechanical Properties of Composite Article (Flexural Test)

The fiber-reinforced resin base materials (unidirectional base materials having a width of 50 mm and a thickness of 0.08 mm) obtained in each of the Examples and Comparative Examples were laminated in the 0° direction, and press molded to achieve a thickness of 2.0 mm, a width of 100 mm and a length of 250 mm, to obtain a fiber-reinforced resin molded article. Rectangular samples for flexural test having a width of 15 mm, a length of 125 mm and a thickness of 2.0 mm were cut out from each resulting molded article, and flexural tests (n=5 each) were carried out in accordance with ASTM D790. The higher the numerical values of the thus measured flexural strength and flexural modulus, the better the mechanical properties of the composite material.

Heat Resistance of Composite Article (High Temperature Flexural Test)

The fiber-reinforced resin base materials (unidirectional base materials having a width of 50 mm and a thickness of 0.08 mm) obtained in each of the Examples and Comparative Examples were laminated in the 0° direction, and press molded to achieve a thickness of 2.0 mm, a width of 100 mm and a length of 250 mm, to obtain a fiber-reinforced resin molded article. Rectangular samples for flexural test having a width of 15 mm, a length of 125 mm and a thickness of 2.0 mm were cut out from each resulting molded article, and flexural tests (n=5 each) at temperatures of 23° C., 90° C., 110° C. and 120° C. were carried out in accordance with ASTM D790, using a tensile testing machine, Instron 5565, equipped with a thermostatic chamber. The higher the numerical value of the thus measured flexural modulus, the better the stiffness at high temperature of the composite material.

Impregnation Properties and Thermal Stability

A cross section in the thickness direction of the fiber-reinforced resin base material obtained in each of the Examples and Comparative Examples was observed as follows. A sample in which each fiber-reinforced resin base material was embedded in an epoxy resin was prepared, and the sample cross section was polished until the cross section of the fiber-reinforced resin base material in the thickness direction can be observed in a favorable manner. An image of the cross section of the polished sample was captured at a magnification of 400 times, using an ultra-deep color 3D profile measuring microscope VHX-9500 (controller section)/VHZ-100R (measuring section) (manufactured by Keyence corporation). The image of a region of a thickness of 500 μm and a width of 500 μm of the fiber-reinforced resin base material was captured. In the captured image, the areas of the portions occupied by the resin and the areas of void portions were determined, and the impregnation rate was calculated in accordance with equation (4):

Impregnation rate (%)=100×(total area of portions occupied by resin)/{(total area of portions occupied by resin)+(total area of void portions)}  (4).

The volume of voids decreases when the impregnation properties and the thermal stability are high, and the volume of voids increases when at least one of the impregnation properties and the thermal stability is low. Therefore, the impregnation properties and the thermal stability of the respective fiber-reinforced resin base materials were evaluated in the following two grades, using the impregnation rate described above as the evaluation standard, and those evaluated as "Good" were regarded as acceptable. The fiber-reinforced resin base materials in the first example were produced at processing temperatures of the melting point+60° C., and the melting point+100° C. The fiber-reinforced resin base materials in the second example were produced at processing temperatures of the melting point+60° C., and the melting point+100° C.

Good: the impregnation rate is 98% or more.

Poor: the impregnation rate is less than 98%.

Surface Quality

The surface quality of the fiber-reinforced resin base materials obtained in the respective Examples and Comparative Examples was visually observed. The surface quality was evaluated in the following two grades, and those evaluated as "Good" were regarded as acceptable.

Good: cracks on the surface, the discoloration of the matrix resin and the exposure of the reinforcing fibers were not observed.

Poor: cracks on the surface, the discoloration of the matrix resin and the exposure of the reinforcing fibers were observed.

The fiber-reinforced resin base materials in the first example were produced at processing temperatures of the melting point+60° C., and the melting point+100° C. The fiber-reinforced resin base materials in the second example were produced at processing temperatures of the melting point+60° C., and the melting point+100° C.

Raw Materials

In the Examples and Comparative Examples, the raw materials as described below were used.

Reference Example 1

Polyphenylene Sulfide Resin (A)

Production of Polyphenylene Sulfide (A-1)

To a 70-liter autoclave equipped with a stirrer, 8,267.37 g (70.00 moles) of a 47.5% sodium hydrosulfide, 2,957.21 g (70.97 moles) of a 96% sodium hydroxide, 11,434.50 g (115.50 moles) of N-methyl-2-pyrrolidone (NMP), 2,583.00 g (31.50 moles) of sodium acetate, and 10,500 g of ion exchanged water were charged. The resulting mixture was gradually heated to 245° C. over about 3 hours at normal pressure while passing nitrogen therethrough, to remove 14,780.1 g of water and 280 g of NMP by distillation, followed by cooling the reaction vessel to 160° C. The amount of moisture remaining in the system per 1 mole of the alkali metal sulfide charged was 1.06 moles, including the moisture consumed in the hydrolysis of NMP. Further, the evaporated amount of hydrogen sulfide was 0.02 moles per 1 mole of the alkali metal sulfide charged.

Subsequently, 10,235.46 g (69.63 moles) of p-dichlorobenzene and 9,009.00 g (91.00 moles) of NMP were added, the reaction vessel was sealed under a nitrogen gas, and heated to 238° C. at a rate of 0.6° C./min, while stirring at 240 rpm. After performing the reaction at 238° C. for 95 minutes, the reaction vessel was heated to 270° C. at a rate of 0.8° C./min. After performing the reaction at 270° C. for 100 minutes, the reaction vessel was cooled to 250° C. at a rate of 1.3° C./min, while injecting 1,260 g (70 moles) of water over 15 minutes. Thereafter, the reaction vessel was cooled to 200° C. at a rate of 1.0° C./min, followed by quenching to room temperature.

The content of the reaction vessel was taken out and diluted with 26,300 g of NMP, then filtered through a sieve (80 mesh) to separate solids from the solvent, and the resulting particles were washed and filtered with 31,900 g of NMP. The thus obtained particles were washed and filtered several times with 56,000 g of ion exchanged water, and then washed and filtered with 70,000 g of a 0.05% by weight aqueous solution of acetic acid. After washing and filtering with 70,000 g of ion exchanged water, the resulting water-containing PPS particles were dried with hot air at 80° C., and then dried at 120° C. under reduced pressure. GPC measurement of the resulting PPS resin was performed, and as a result, the PPS resin had a weight average molecular weight of 73,000, and a degree of dispersion of 2.80.

Production of Polyphenylene Sulfide (A-2)

To a 70-liter autoclave equipped with a stirrer and a bottom stop valve, 8.27 kg (70.00 moles) of a 47.5% sodium hydrosulfide, 2.94 kg (70.63 moles) of a 96% sodium hydroxide, 11.45 kg (115.50 moles) of NMP, 1.89 kg (23.1 moles) of sodium acetate, and 5.50 kg of ion exchanged water were charged. The resulting mixture was gradually heated to 245° C. over about 3 hours at normal pressure while passing nitrogen therethrough, to remove 9.77 kg of water and 0.28 kg of NMP by distillation, followed by cooling the reaction vessel to 200° C. The amount of moisture remaining in the system per 1 mole of the alkali metal sulfide charged was 1.06 moles, including the moisture consumed in the hydrolysis of NMP. Further, the evaporated amount of hydrogen sulfide was 0.02 moles per 1 mole of the alkali metal sulfide charged.

Thereafter, the reaction vessel was cooled to 200° C., and 10.42 kg (70.86 moles) of p-dichlorobenzene and 9.37 kg (94.50 moles) of NMP were added thereto. The reaction vessel was sealed under a nitrogen gas, heated from 200° C. to 270° C. at a rate of 0.6° C./min while stirring at 240 rpm, and the reaction was performed at 270° C. for 140 minutes. Subsequently, 2.40 kg (133 moles) of water was injected while cooling the reaction vessel from 270° C. to 250° C. over 15 minutes. After gradually cooling from 250° C. to 220° C. over 75 minutes, the reaction vessel was quenched to around room temperature, and the content of the vessel was taken out.

The content was diluted with about 35 liters of NMP to prepare a slurry, the resulting slurry was stirred at 85° C. for 30 minutes, and then filtered through an 80-mesh wire mesh (with an aperture of 0.175 mm), to obtain solids. The resulting solids were washed and filtered with about 35 liters of NMP in the same manner. The resulting solids were diluted with 70 liters of ion exchanged water, stirred at 70° C. for 30 minutes, and filtered through the 80-mesh wire mesh to collect solids. This operation was repeated for a total of three times. The thus obtained solids and 32 g of acetic acid were diluted with 70 liters of ion exchanged water, stirred at 70° C. for 30 minutes, and then filtered through the 80-mesh wire mesh. The resulting solids were further diluted with 70 liters of ion exchanged water, stirred at 70° C. for 30 minutes, and then filtered through the 80-mesh wire mesh to collect solids. The thus obtained solids were dried at 120° C. under a nitrogen gas stream, to obtain a dried PPS resin. The thus obtained dried PPS resin completely dissolved in 1-chloronaphthalene at 210° C. GPC measurement of the resulting PPS resin was performed, and as a result, the PPS resin had a weight average molecular weight of 48,600, and a degree of dispersion of 2.66.

Reference Example 2

Thermoplastic Resin (B) Having Glass-Transition Temperature of 100° C. or Higher Polyetherimide (hereinafter, referred to as PEI): "ULTEM" (registered trademark) 1000, manufactured by General Electric Company; glass-transition temperature: 220° C.

Polyethersulfone (PES): "SUMIKAEXCEL" (registered trademark) 3600 G, manufactured by Sumitomo Chemical Co., Ltd; glass-transition temperature: 225° C.

Modified polyphenyleneether (m-PPE): "Iupiace" (registered trademark) YPX 100L, manufactured by Mitsubishi Chemical Corporation; glass-transition temperature: 211° C.

Reference Example 3

Compound (C) Having One or More Groups Selected from the Group Consisting of Epoxy, Amino and Isocyanate Groups (C-1) 3-Isocyanatepropyltriethoxysilane: KBE 9007, manufactured by Shin-Etsu Chemical Co., Ltd.
(C-2) 2-(3,4-Epoxycyclohexyl)ethyltrimethoxysilane: KBM 303, manufactured by Shin-Etsu Chemical Co., Ltd.
(C-3) 3-Aminopropyltriethoxysilane: KBE-903, manufactured by Shin-Etsu Chemical Co., Ltd.

Reference Example 4

Carbon Fiber Bundles (CF-1): Carbon fiber bundles (product name: T700S-12K, manufactured by Toray Industries, Inc.)

Examples 1 to 7 and Comparative Examples 1 to 6

Method of Producing Pellets of Resin Compositions

In each of the Examples and Comparative Examples, the respective raw materials shown in Table 1 excluding the carbon fiber bundles were dry blended in the proportions shown in Table 1. Thereafter, the resulting mixture was melt-kneaded using a twin screw extruder, TEX 30α (co-rotating, fully intermeshing screws, screw diameter: 30 mm, L/D=45, number of kneading sections: 5) equipped with a vacuum vent, manufactured by The Japan Steel Works, Ltd., at a screw rotational speed of 300 rpm and a discharge rate of 20 kg/h, with the cylinder temperature adjusted such that the resin temperature at the die exit was 300° C. The resulting extrudate was pelletized by a strand cutter, and subjected to the evaluations as described above. The evaluation results are shown in Table 1.

Examples 1 to 7, Comparative Example 4 to 6

Method of Producing Fiber-Reinforced Resin Base Materials

In each of the Examples and Comparative Examples, 16 pieces of bobbins around which the carbon fiber bundles had been wound were prepared, and the carbon fiber bundles were continuously fed from the respective bobbins through thread guides. The continuously fed carbon fiber bundles were impregnated with the resin composition which had been obtained by the above-described method and fed in a fixed amount from a filled feeder, in an impregnation die. The carbon fibers impregnated with the resin composition in the impregnation die were continuously drawn out from the nozzle of the impregnation die at a drawing rate of 1 m/min, using a take-up roll. The temperature at which the carbon fibers are drawn out from the nozzle is referred to as the processing temperature. The drawn-out carbon fiber bundles were passed through chill rolls to cool and solidify the resin composition, and were wound by a winder as a continuous fiber-reinforced resin base material. Each resulting fiber-reinforced resin base material had a thickness of 0.08 mm and a width of 50 mm. The reinforcing fibers in the fiber-reinforced resin base material were oriented in one direction, and the volume fraction thereof was 60%. Each resulting fiber-reinforced resin base material was subjected to the evaluations described above. The evaluation results are shown in Table 1.

TABLE 1

| | | Example 1 | Example 2 | Example 3 | Example 4 | Example 5 | Example 6 | Example 7 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|---|
| Polyphenylene sulfide resin (A) | Component (A) | A-1 | A-1 | A-1 | A-1 | A-1 | A-1 | A-2 | A-1 | A-1 | A-1 | A-2 | A-1 | A-1 |
| | Amount of component (A) % by weight | 90 | 80 | 90 | 90 | 90 | 90 | 90 | 90 | 80 | 100 | 100 | 100 | 90 |
| Thermoplastic resin (B) having a glass-transition temperature of 100° C. or higher | Component (B) | PEI | PEI | PES | m-PPE | PEI | PEI | PEI | PEI | PEI | — | — | — | PEI |
| | Amount of component (B) % by weight | 10 | 20 | 10 | 10 | 10 | 10 | 10 | 10 | 20 | — | — | — | 10 |
| (C) Compound having one or more groups selected from epoxy, amino and isocyanate groups | Component (C) | C-1 | C-1 | C-1 | C-1 | C-2 | C-3 | C-1 | C-1 | C-1 | — | — | — | — |
| | Amount of component (C)* parts by weight* | 1.0 | 1.0 | 1.0 | 1.0 | 1.0 | 1.0 | 1.0 | 1.0 | 1.0 | — | — | — | — |
| Carbon fiber bundles (CF bundles) | CF bundle type | CF-1 | CF-1 | CF-1 | CF-1 | CF-1 | CF-1 | CF-1 | — | — | — | CF-1 | CF-1 | CF-1 |
| | CF Amount % by volume | 60 | 60 | 60 | 60 | 60 | 60 | 60 | 0 | 0 | 0 | 60 | 60 | 60 |
| Polymer flowability | Melt viscosity (320° C., shear rate 9,728 sec⁻¹) Pa·s | 110 | 120 | 115 | 120 | 112 | 105 | 95 | 110 | 120 | 70 | 43 | 70 | 150 |
| Heat resistance of polymer | T1 (glass-transition temperature) °C. | 110 | 110 | 110 | 110 | 110 | 111 | 110 | 110 | 110 | 110 | 110 | 110 | 110 |
| | T2 (glass-transition temperature) °C. | 200 | 200 | 205 | 200 | 200 | 201 | 200 | 200 | 200 | — | — | — | 200 |
| DMA method (tensile mode) | G' (storage modulus)/ 23° C. MPa | 3,840 | 4,365 | 3,850 | 3,820 | 3,830 | 3,780 | 3,830 | 3,840 | 4,365 | 3,516 | 3,416 | 3,516 | 3,800 |
| | G' (storage modulus)/ 90° C. MPa | 3,370 | 3,888 | 3,300 | 3,350 | 3,328 | 3,200 | 3,340 | 3,370 | 3,888 | 3,056 | 3,020 | 3,056 | 3,200 |
| | G' (storage modulus)/ 110° C. MPa | 1,280 | 1,505 | 1,290 | 1,310 | 1,250 | 1,230 | 1,260 | 1,280 | 1,505 | 1,310 | 1,280 | 1,310 | 1,250 |
| | G' (storage modulus)/ 120° C. MPa | 780 | 950 | 800 | 800 | 795 | 770 | 780 | 780 | 950 | 713 | 715 | 713 | 750 |
| Mechanical properties of composite article | Tensile strength MPa | 2,400 | 2,450 | 2,400 | 2,450 | 2,400 | 2,420 | 2,380 | — | — | — | 2,350 | 2,380 | 2,320 |
| | Tensile modulus % | 130 | 130 | 131 | 131 | 131 | 127 | 128 | — | — | — | 130 | 132 | 125 |
| | Flexural strength MPa | 1,600 | 1,650 | 1,600 | 1,600 | 1,580 | 1,520 | 1,590 | — | — | — | 1,540 | 1,600 | 1,550 |
| | Flexural modulus GMa | 120 | 120 | 121 | 120 | 121 | 121 | 120 | — | — | — | 120 | 120 | 120 |
| | Tg1 (glass-transition temperature) °C. | 125 | 130 | 125 | 125 | 125 | 125 | 125 | — | — | — | 110 | 110 | 110 |
| Heat resistance of composite article | Tg2 (glass-transition temperature) °C. | 190 | 186 | 195 | 190 | 190 | 190 | 190 | — | — | — | — | — | 200 |
| DMA method | G' (storage modulus)/ MPa | 13,500 | 15,500 | 13,400 | 13,300 | 13,300 | 13,000 | 13,200 | — | — | — | 10,500 | 10,800 | 13,000 |

TABLE 1-continued

| | | Example 1 | Example 2 | Example 3 | Example 4 | Example 5 | Example 6 | Example 7 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|---|
| (bending mode) | G' (storage modulus)/ 23° C. 90° C. | MPa | 11,800 | 13,500 | 12,000 | 11,900 | 11,900 | 11,200 | 11,700 | — | — | — | 9,360 | 9560 | 9,800 |
| | G' (storage modulus)/ 110° C. | MPa | 9,390 | 10,800 | 9,450 | 9,250 | 9,400 | 9,320 | 9,350 | — | — | — | 7,000 | 7,140 | 7,300 |
| | G' (storage modulus)/ 120° C. | MPa | 9,040 | 10,500 | 9,230 | 9,000 | 9,060 | 9,000 | 9,020 | — | — | — | 6,350 | 6,400 | 6,700 |
| Heat resistance of composite article (flexural test at high temperature) | Flexural modulus/ 23° C. | GPa | 120 | 120 | 120 | 120 | 120 | 120 | 120 | — | — | — | 120 | 120 | 120 |
| | Flexural modulus/ 90° C. | GPa | 113 | 117 | 115 | 110 | 112 | 109 | 112 | — | — | — | 102 | 104 | 107 |
| | Bending strain/ 90° C. | % | 1.3 | 1.4 | 1.3 | 1.3 | 1.3 | 1.3 | 1.3 | — | — | — | — | 1.2 | — |
| | Flexural modulus/ 110° C. | GPa | 88 | 98 | 90 | 85 | 88 | 85 | 87 | — | — | — | 73 | 75 | 78 |
| | Bending strain/ 90° C. | % | 1.1 | 1.2 | 1.1 | 1.1 | 1.2 | 1.1 | 1.1 | — | — | — | — | 0.7 | — |
| | Flexural modulus/ 120° C. | GPa | 85 | 94 | 86 | 83 | 86 | 82 | 84 | — | — | — | 63 | 65 | 67 |
| | Bending strain/ 120° C. | % | 1.0 | 1.1 | 1.0 | 0.9 | 1.1 | 1.0 | 1.0 | — | — | — | — | 0.5 | — |
| Impregnation properties | Melting point (Tm) + 60° C. | Evaluation | Good | Good | Good | Good | Good | Good | Good | — | — | — | Good | Good | Poor |
| | Melting point (Tm) + 100° C. | Evaluation | Good | Good | Good | Good | Good | Good | Good | — | — | — | Good | Good | Poor |
| Surface quality | Melting point (Tm) + 60° C. | Evaluation | Good | Good | Good | Good | Good | Good | Good | — | — | — | Good | Good | Poor |
| | Melting point (Tm) + 100° C. | Evaluation | Good | Good | Good | Good | Good | Good | Good | — | — | — | Good | Good | Poor |

*Amount of component (C): Mixed amount [parts by weight] of component (C) with respect to 100 parts by weight of the total of the amount of component (A) + the amount of component (B)

The results of Examples 1 to 7 and Comparative Examples 1 to 6 will be compared and described.

Figure 2:
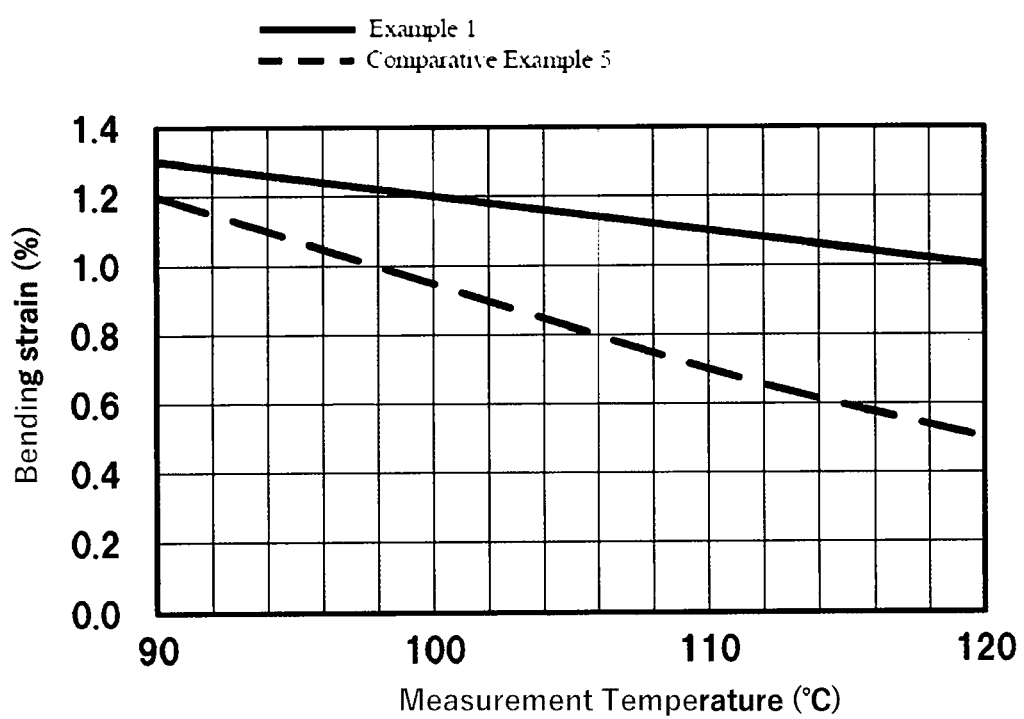
FIG. 2 is a graph showing the relationship between the measurement temperature and the bending strain of the fiber-reinforced resin base materials of Example 1 and Comparative Example 5.

In Example 1, the glass-transition temperature Tg 1 of the polymer was 110° C., as in Comparative Example 1 in which (CF-1) was not used, showing the same level of polymer heat resistance; however, the glass-transition temperature Tg 1 of the composite article was significantly increased to 125° C., showing a marked improvement in the heat resistance. Further, it can be seen from FIGS. 1 and 2 that, in Comparative Example 5 in which the resin composition does not contain PEI as the component (B), Tg 1 of the composite article is 110° C. and is lower compared to that of Example 1, which is 125° C., and that the bending strain at 110° C. of the composite article is 0.7% and is lower compared to that of Example 1, which is 1.1%. These results show an impaired heat resistance. In Comparative Example 6 in which the resin composition does not contain the component (C-1), Tg 1 of the composite article is 110° C. and is lower compared to that of Example 1, which is 125° C., resulting in a defective impregnation and a decrease in surface quality. It can be seen from these results that the fiber-reinforced resin base material impregnated with the PPS resin composition does not exhibit a sufficient improving effect, when the resin composition does not contain the component (B) and/or the component (C).

In addition, the composite materials of Examples 3 and 4 in each of which the component (B) was changed to a component other than PEI, and the composite materials of Examples 5 and 6 in each of which the component (C) was changed to a component other than (C-1), differing from Example 1, all have an excellent heat resistance and mechanical strength, as with those of Example 1.

INDUSTRIAL APPLICABILITY

The fiber-reinforced resin base material in the first or the second example, or a molded article thereof, can be used in various types of applications such as aircraft parts, automotive parts, electric and electronic components, building materials, various containers, daily necessities, household goods and hygiene products, utilizing excellent properties thereof In particular, the fiber-reinforced resin base material, or a molded article thereof, is particularly preferably used in applications in which impregnation properties, heat aging resistance and surface appearance are required. Examples of such applications include peripheral parts of aircraft engines, exterior parts of aircraft parts, automotive body parts and vehicle skeletons, peripheral parts of automotive engines, automotive under-hood parts, automotive gear parts, automotive interior parts, automotive exterior parts, parts for air intake and exhaust systems, parts for engine cooling water systems, automotive electrical components, and electric and electronic components. Specific examples of applications in which the fiber-reinforced resin or a molded article thereof is preferably used, include: peripheral parts of aircraft engines such as fan blades; aircraft related parts such as landing gear pods, winglets, spoilers, edges, ladders, elevators, fairing and ribs; automotive body parts such as various sheets, front bodies, under bodies, various pillars, various members, various frames, various beams, various supports, various rails and various hinges; peripheral parts of automotive engines such as engine covers, air intake pipes, timing belt covers, intake manifolds, filler caps, throttle bodies and cooling fans; automotive under-hood parts such as cooling fans, tops and bases of radiator tanks, cylinder head covers, oil pans, tubes for brake piping and fuel piping, and parts for waste gas systems; automotive gear parts such as gears, actuators, bearing retainers, bearing cages, chain guides and chain tensioners; automotive interior parts such as shift lever brackets, steering lock brackets, key cylinders, inner door handles, door handle cowls, in-vehicle mirror brackets, air conditioner switches, instrumental panels, console boxes, glove boxes, steering wheels and trims; automotive exterior parts such as front fenders, rear fenders, fuel rids, door panels, cylinder head covers, door mirror stays, tailgate panels, license garnishes, roof rails, engine mount brackets, rear garnishes, rear spoilers, trunk lids, rocker moldings, moldings, lamp housings, front grills, mud guards and side bumpers; parts for air intake and exhaust systems such as air intake manifolds, intercooler inlets, turbochargers, exhaust pipe covers, inner bushes, bearing retainers, engine mounts, engine head covers, resonators and throttle bodies; parts for engine cooling water systems such as chain covers, thermostat housings, outlet pipes, radiator tanks, alternators and delivery pipes; automotive electrical components such as connectors and wire harness connectors, motor parts, lamp sockets, sensor-equipped switches and combination switches; and electric and electronic components including: electric components such as power generators, electric motors, transformers, current transformers, voltage regulators, rectifiers, resistors, invertors, relays, power contacts, switches, breakers, switches, knife switches, multipole rods, motor casings, television housings, notebook personal computer housings and internal components, CRT display housings and internal components, printer housings s and internal components, housings and internal components of mobile terminals such as mobile phones, mobile personal computers and handheld mobiles, IC and LED-compatible housings, condenser back plates, fuse holders, various gears, various casings and cabinets; and electronic components such as connectors, SMT-compatible connectors, card connectors, jacks, coils, coil bobbins, sensors, LED lamps, sockets, resistors, relays, relay casings, reflectors, small switches, power supply parts, coil bobbins, condensers, variable capacitor casings, optical pickup chasses, vibrators, various terminal boards, transformers, plugs, printed circuit boards, tuners, speakers, microphones, headphones, small motors, magnetic head bases, power modules, Si power modules and SiC power modules, semiconductors, liquid crystals, FDD carriages, FDD chasses, motor brush holders, transformer members, parabola antennas and computer-related components.

The invention claimed is:

1. A fiber-reinforced resin base material comprising carbon fibers oriented in one direction, said carbon fibers being impregnated with a polyphenylene sulfide resin composition, wherein said fiber-reinforced resin base material has a glass-transition temperature, as measured by the DMA method (bending mode), of 115° C. or higher;

wherein said polyphenylene sulfide resin composition:
  has a melt viscosity measured at an orifice length of 5 mm, an orifice diameter of 0.5 mm, a temperature of 320° C., and a shear rate of 9,728 sec$^{-1}$ of 120 Pa·s or less;
  comprises 99 to 60% by weight of a polyphenylene sulfide resin (A) and 1 to 40% by weight of a thermoplastic resin (B) having a glass-transition temperature of 100° C. or higher, with respect to 100% by weight of the total amount of said polyphenylene sulfide resin (A) and said thermoplastic resin (B) having a glass-transition temperature of 100° C. or higher;
  wherein said thermoplastic resin (B) having a glass-transition temperature of 100° C. or higher forms island phases; and said thermoplastic resin (B) having a glass-transition temperature of 100° C. or higher has a number average particle size of 10 μm or less;
wherein said thermoplastic resin (B) having a glass-transition temperature of 100° C. or higher is at least one amorphous resin selected from the group consisting of a polyetherimide resin, a polyethersulfone resin, a polyphenyl sulfone and a polysulfone resin; and
wherein said polyphenylene sulfide resin composition further comprises a compound (C) having one or more groups selected from the group consisting of isocyanate groups, in an amount of 0.1 to 10 parts by weight with respect to 100 parts by weight of the total amount of said polyphenylene sulfide resin (A) and said thermoplastic resin (B) having a glass-transition temperature of 100° C. or higher.

2. The fiber-reinforced resin base material according to claim 1, having a bending strain measured at 110° C., using a tensile testing machine-equipped with a thermostatic chamber of a molded specimen in accordance with ASTM D790 of 1.1% or more.

3. The fiber-reinforced resin base material according to claim 1, wherein said thermoplastic resin (B) having a glass-transition temperature of 100° C. or higher, which forms said island phases, has a number average particle size smaller than the distance z between reinforcing fibers represented by equation (1):

$$z = y - 2r \qquad (1)$$

wherein z: distance between the carbon fibers, y: distance between centers of reinforcing fibers, r: fiber radius.

* * * * *